United States Patent [19]

Freeman et al.

[11] Patent Number: 5,840,113
[45] Date of Patent: Nov. 24, 1998

[54] TREATED CLAY PRODUCT, METHODS OF MAKING AND USING AND PRODUCTS THEREFROM

[75] Inventors: Gary M. Freeman; Carl J. Marshall, Jr.; Walter O. Lackey; Thomas J. Lynch, all of Macon, Ga.

[73] Assignee: J.M. Huber Corporation, Edison, N.J.

[21] Appl. No.: 59,375

[22] Filed: Apr. 14, 1998

Related U.S. Application Data

[62] Division of Ser. No. 841,367, Apr. 30, 1997.

[51] Int. Cl.$^6$ ...................................................... C09C 1/42
[52] U.S. Cl. ......................... 106/487; 106/486; 501/146; 501/148; 209/10; 427/344; 427/343; 428/405; 428/447; 423/112; 423/118.1; 423/328.1; 423/328.2
[58] Field of Search ..................................... 106/486, 487, 106/416, 286.5, 287.17; 501/146, 148; 427/212, 344, 343; 428/405, 447; 209/10; 423/112, 118.1, 328.1, 328.2

[56] References Cited

U.S. PATENT DOCUMENTS

| | | |
|---|---|---|
| 3,738,948 | 6/1973 | Dunnom . |
| 3,957,718 | 5/1976 | Pochert et al. . |
| 4,014,827 | 3/1977 | Hart et al. . |
| 4,069,220 | 1/1978 | Orem et al. . |
| 4,311,628 | 1/1982 | Abdou-Sabet et al. . |
| 4,511,697 | 4/1985 | Sohnemann . |
| 4,525,281 | 6/1985 | Cooper . |
| 4,714,733 | 12/1987 | Itoh et al. . |
| 4,782,106 | 11/1988 | Fricke et al. . |
| 4,810,578 | 3/1989 | Prescott et al. . |
| 4,929,512 | 5/1990 | Nishimura et al. . |
| 4,937,104 | 6/1990 | Pühringer . |
| 4,987,939 | 1/1991 | Yamada et al. . |
| 5,008,305 | 4/1991 | Kennan et al. . |
| 5,030,692 | 7/1991 | Durairaj . |
| 5,061,461 | 10/1991 | Sennett et al. ........................... 423/112 |
| 5,082,886 | 1/1992 | Jeram et al. . |
| 5,112,782 | 5/1992 | Brown et al. ............................ 106/487 |
| 5,116,886 | 5/1992 | Wolff et al. . |
| 5,227,425 | 7/1993 | Rauline . |
| 5,449,402 | 9/1995 | Whalen-Shaw .......................... 106/416 |
| 5,454,864 | 10/1995 | Whalen-Shaw .......................... 106/416 |
| 5,591,794 | 1/1997 | Fukumoto et al. . |

OTHER PUBLICATIONS

V.M. Gorshkov et al., "Resin Mixt. Useful for Rubberised Rollers in Textile Industry—Comprises Butadiene Styrene and Polyisoprene Rubbers with Kaolin and Special Silica Filler, for Improved Uniform and Smooth Milled Fabric", Abstract No. RU 2033006, Sep. 20, 1995.

"Heat Resistant Belt with Teeth—In Which Bottom Convas of Belt is Bonded with Adhesive Compsn. Contg. Hydrogenated Nitrile Rubber", Abstract No. JP1058831, Mar. 6, 1989.

A. Arefeva et al., "Diene Rubber Based Vulcanisate Compsn.—Contains Rubber, Resorcinol—Tetra Amine, Zinc Oxide, Straearin, Sulphur, Sulphenamide Contg. Accelerator and Aminated Carbon", Abstract No. SU 1219606, Mar. 23, 1986.

A.A. Delektorsk, Vulcanizing Unsatd. Synthetic Rubber Compsn.—Contg., Diene Rubber—Modified with Complex of Tretra Methylenen Dietjyele Amine and Recorcinol, Abstract No. SU 981324A. Dec. 17, 1982.

Rubber Compsn. for Adhesion to Steel Cord–Comprises Synthetic Polyisoprene, Another Rubber and Cobalt Salt of Organic Acid and/or Formaldehyde, Recsorcinol, Adhesion, Accelerator, Abstract No. JP 54052188A, Apr. 24, 1979.

S. Borgmann, Rubber Composite Articles Prodn.—With Addn. of Homogenous Adduct Comprising Resorcinol—Hexa Methylene Tetramine Crosslinker Absorbed on Zeolite or Silicate Layer, Abstract No. DD276295, Feb. 21, 1990.

Producing Hydrophobic Inorganic CPD Fine Particles—Includes Preparing AQ Dispersion of Inorganic CPD Fine Particles Contg. Surfactant, Adding Tri Alkoxy–Silane to Dispersion, Abstract No. JP06285363, Oct. 11, 1994.

*Primary Examiner*—Michael Marcheschi
*Attorney, Agent, or Firm*—Dickinson Wright PLLC

[57] ABSTRACT

An improved finely divided rubber-reinforcing clay mineral composition can be produced by employing a hydrous kaolin clay surface treated with a functional silane, a methylene donor compound such as hexamethylenetetramine, and a multifunctional methylene acceptor such as resorcinol. A novel process of preparation is provided. The improved reinforcing, treated clay filler can be combined with natural or synthetic elastomer compositions which can be cured to elastomer products which have improved physical properties, such as modulus, tensile, tear, wear resistance and/or resistance to heat build-up.

14 Claims, 3 Drawing Sheets

| Kaolin Clay | Dispersant |
|---|---|
| Clay B | Polyacrylate 0.35% |
| Clay A-1 | Polyacrylate 0.19% |
| Clay A-2 | Sodium silicate 0.65% |
| Clay A-3 | Sodium silicate 0.32% |
| Clay C | Trisodium polyphosphate 0.30% |

5,840,113

TREATED CLAY PRODUCT, METHODS OF MAKING AND USING AND PRODUCTS THEREFROM

This application is a division of United States patent application Ser. No. 08/841,367, filed Apr. 30, 1997.

FIELD OF THE INVENTION

The present invention is directed to surface treated clays that contain a multi-component treatment modification consisting of a functional silane, a methylene donor and a methylene acceptor for use in natural or synthetic rubber systems as a reinforcing filler or extender.

BACKGROUND ART

In the prior art, the use of surface treated clays, such as silane treated kaolin clays, as reinforcing fillers for polymers or elastomerics is known. Typically, silane treated clays employing sulfur functional silanes are utilized in sulfur cured elastomeric systems requiring properties such as high tensile strength, high modulus or the like. Organo-functional silane treatments used on clays or other mineral fillers are often used alone or sometimes in combination with other silanes, such as alkylsilanes, but generally not in combination with other non-silicon based reinforcement additives. For example, U.S. Pat. Nos. 4,810,578 and 5,116,886 describe the pre-treatment of hydrous kaolin clays and oxide or silicate fillers with a sulfur-functional silane for use as a reinforcing filler in elastomers. Sulfur cured elastomers containing reinforcing fillers are often found in automotive applications such as tires (e.g., carcass, innerliner, tire tread and white sidewalls), belts, hoses or the like.

Outside the scope of treated clay fillers, it is also well known to use resorcinol-formaldehyde (R-F) resins or combinations of resorcinol (a methylene acceptor) and hexamethylenetetramine (a methylene donor that will hereinafter be referred to as hexa) as direct chemical additives to rubber compounds to promote good adhesion properties, particularly in connection with adhering cords of fabric to rubber stock. The technology of building reinforcing cords of fabric into rubber articles is an essential aspect of many modern rubber applications. In particular, the use of R-F type resins (or its resorcinol/hexa precursors) along with the addition of silica fillers has found utility in many elastomeric applications for adhesion promotion as described in U.S. Pat. Nos. 3,738,948 and 4,782,106.

In U.S. Pat. No. 3,738,948 to Dunnom, a fiber reinforced rubber composition employing a vulcanization product comprising a finely-divided reinforcing siliceous filler, a methylene donor compound such as hexamethylenetetramine, a multifunctional phenol such as resorcinol and a compatible metal soap such as calcium stearate is disclosed. This patent recognizes that fiber reinforcement such as textile mats can be made to adhere to rubber compositions and particularly rubber tires by the use of an adhesive mixture comprising a finely-divided precipitated siliceous filler, a methylene donor compound and a polyfunctional phenol. One of the problems with these mixtures is the degradation of the hexamethylene compound to reaction products which attack the fibers of the textile mats. The Dunnom patent overcomes this problem by incorporating a metal soap into the rubber matrix.

U.S. Pat. No. 4,782,106 to Fricke, et. al. is another example of a rubber adhesive mixture using an adhesive system 30 of resorcinol/hexamethylenetetramine with a carbon black filler. This patent does not teach nor suggest a treated clay composition comprising these chemical additives in combination with a functional silane as a reinforcing filler nor the unexpected benefits associated therewith.

With ever increasing competition in the elastomer industry, more and more applications are being developed which need high levels of reinforcement, either in terms of modulus, tensile strength, tear or compression set. To date, silica or carbon black fillers have been the only types of fillers which could provide the desired level of reinforcement in elastomers. For example, rubber formulations commonly referred to as "green tire" formulations have been developed for fabricating tire tread. These tire tread formulations, as described in U.S. Pat. No. 5,227,425 have greatly improved physical properties and offer low rolling resistance but require large amounts of silica and carbon black.

Although carbon black and silica offer high levels of reinforcement in elastomers, both of these filler systems are not without their disadvantages. Carbon black generally cannot be used in applications wherein the elastomer compound needs to be pigmented (i.e., white or non-black). In addition, a very fine particle size carbon black is needed to provide high levels of reinforcement and these carbon blacks can be extremely expensive. Further, in many tire related applications carbon blacks are known to contribute to higher heat build-up properties, as compared to clays, which can have deleterious effects on the service life of the tire.

Using a precipitated or fumed silica as a filler also contributes greatly to the cost of the compound since these silicas are often extremely expensive on a per pound basis. Moreover, they are difficult to process in elastomeric systems. Since silica fillers have extremely high surface areas, they are highly absorptive. When mixed with a given elastomeric compound, the silicas tend to absorb the oils, plasticizers or the like in the compound and make it difficult to mix the compound. This characteristic can often lead to poor filler dispersion thereby reducing expected physical properties. The use of high levels of precipitated silica in tire tread compounds provides excellent rolling resistance and good traction properties, but it is also known to cause the build-up of undesirable static charge such that they require the co-use of other semi-conductive fillers. Ideally, these replacement fillers should have virtually no deleterious effects on rolling resistance and rubber physical properties as compared to silica. Nevertheless, if one were seeking to produce a non-black filled elastomeric compound having a high level of reinforcement, silica and its attendant disadvantages has historically been the only filler choice.

In addition to the combined use of silicas and R-F systems in rubber for adhesion, silicas have been used with or pre-treated with silanes for application in elastomer systems. For example, U.S. Pat. No. 5,008,305 describes a reinforcing silica for use in silicone elastomers. The reinforcing silica is prepared by treating the dry silica with a combination of both phenylalkoxysilane and vinylalkoxysilane. This combination of surface treatment improves compression set and heat aging in silicone elastomers. This prior art differs from the present invention in the use of a treated silica as the reinforcing agent (as opposed to a treated hydrous clay) and that both phenyl and vinyl functional silanes are added to the silica in pure form rather than as emulsions. Furthermore, a blend of silanes was required in this prior art composition as opposed to the use of our 3 component surface treatment package consisting of a single functional silane, a methylene donor and a methylene acceptor. Similarly, U.S. Pat. No. 4,714,733 describes a rubber composition containing an ethylene-propylene rubber, an organopolysiloxane having at least two alkenyl groups per molecule, a silica filler, an alkoxysilane, and a thiocarbamyl-containing organosilane. This prior art composition exhibits improved compression set and heat aging, but does not use the unique surface treatment combination of the present invention.

Heretofore, silane treated clays have had limited utility in elastomeric applications requiring high performance because of their relatively low reinforcing benefits. Their ability to replace or extend high performance fillers, such as carbon black or silica, has been modest at best. Known silane treated clays for use in elastomer systems not requiring high performance include the Nucap® and Nulok® clays manufactured by J. M. Huber Corporation of Macon, Ga. The Nucap® silane treated clays use a sulfur functional silane in treatment levels up to about 0.5% by weight of the silane based on dry clay. Exemplary of these sulfur functional silanes include a mercapto-silane, a thiocyanato-silane or a bridging tetrasulfane silane. The Nucap® treated clays are therefore mainly targeted for use in sulfur-cured rubber systems. In comparison, the Nulok® treated clays utilize various amino functional silanes in treatment levels up to about 1.0% by weight and these fillers are used in both sulfur-cured and peroxide-cured compounds although more predominantly in the latter. These Nucap® and Nulok® products, and their competitive counterparts, can be based on kaolin clay substrates ranging from fine particle size waterwashed clays, to waterwashed delaminated clays of relatively coarse particle size to various air-float clays.

Up to the present, it was well recognized that increasing the amount of sulfur functional silanes on the clay did not necessarily increase the various performance properties of a given elastomeric system in a proportional manner. Diminishing incremental performance benefits are provided as silane treatment levels are increased. Thus, the silane treatments have been held to the levels noted above, e.g., about 0.5% by weight and below based on cost/performance considerations.

Besides the inability to provide a high level of performance in elastomeric systems, clay or current treated clays have also presented a problem in regards to their inherent higher specific gravity than that of silica or carbon black. The specific gravity of kaolin clay is 2.6 whereas the specific gravity of silica is about 2.0 to 2.2. Carbon black's specific gravity is about 1.8. In rubber compounds where density is critical, a treated clay cannot be substituted for carbon black or silica on a one to one weight basis while still meeting the density requirements. In other words, less clay must be used than a given phr amount of carbon black or silica to meet the density requirement. In addition, the reduced weight amount of clay must still be able to impart the same filler performance characteristics as the carbon black or silica. Conversely, if the filled rubber compounds are to be formulated to yield equal hardness then about 1.6 parts of clay or treated clay are normally required to replace every 1 part of carbon black while needing to still maintain other physical properties like modulus, tensile strength and tear. At a weight ratio of 1.6/1, this puts treated clays at a cost/performance disadvantage as extenders for larger particle size carbon blacks, i.e., soft carbon blacks, unless the treated clays provide a very high level of performance.

In view of the disadvantages noted above with presently available treated clay products as well as the limitations of silica and carbon black as fillers in elastomeric systems, a need has developed to provide a treated clay product which can be used as a highly effective reinforcement for elastomeric systems.

The present invention solves this need by providing a method of making a surface treated clay consisting of a three component surface treatment system comprising a functional silane, a methylene donor, and a methylene acceptor, and the product therefrom and, in one preferred embodiment, the use of an emulsified functional silane. The treated product resulting therefrom can be used as a reinforcing filler or extender in elastomeric systems to achieve high performance characteristics.

It should be noted that silanes have been used in dispersed or emulsified form in applications other than those employing clays. Patent JP-06285363 describes the production of hydrophobic fine particles of an inorganic compound (more specifically particles of $TiO_2$ pigment) by combining an aqueous dispersion of the inorganic compound with surfactant and alkylsilane for the purpose of obtaining a silicone polymer coating on the surface of fine powders. While the above patent describes a hydrophobic inorganic fine particle composition and a process to produce such a composition, the compositions of this present invention differ from the above by our demonstrated examples of unexpectedly high gains in cured elastomer reinforcing properties using significantly lower levels of silane treatments which are outside the scope of this prior art. In addition, the focus of this prior art was on the use of non-functionalized alkylsilanes as opposed to the functional silanes utilized in the present invention.

The technique of using an amino functional silane emulsion to treat an aqueous mineral slurry is described in U.S. Pat. No. 4,525,281. The treated mineral has improved dewatering properties. As with the current invention, a mineral is treated with a silane emulsion. However, the effective silanes of this present invention are sulfur as well as amino functional silanes which are required to chemically interact with both the kaolin clay and the elastomer. The unexpectedly high elastomer reinforcement benefits of the current invention could not have been predicted from the dewatering benefit described by the prior art.

A silane emulsion is described in U.S. Pat. No. 4,937,104 which is useful for making building material surfaces hydrophobic. The emulsion consists of an alkyltrialkoxysilane in aqueous alcohol. Although this prior art and the current invention use silane emulsions for surface treatment, the current invention requires functional silanes to achieve the reinforcing properties in elastomers.

Further, the observed hydrophobicity benefit in the prior art is unrelated to the reinforcing properties observed in the current invention.

While the prior art recognizes the use of methylene donors and acceptors as adhesion promoters in rubber formulations, it does not teach nor suggest their use in clay surface treatment systems (particularly not in the presence of a functional silane treatment). The closest related art to the present invention is that disclosed by Pochert, et. al. in U.S. Pat. No. 3,957,718. This patent teaches that adding an organosilane to a silica containing mixture can improve the adhesion of vulcanizable mixtures of natural and/or synthetic rubber to reinforcing fillers or supports of textiles and/or metallic fabrics after vulcanization. This adhesion benefit can be provided by a mixture which substantially consists of a synthetic silica or silicate filler of high BET surface area of about 50 to 500 $m^2/g$, a combination of resin forming components such as phenols plus formaldehyde donors and at least one sulfur-functional silane. In a further aspect of Pochert et al., it is also disclosed that the resin forming components can be pre-bound to the fillers by absorption prior to being mixed into the elastomer which reportedly yields substantially better distribution of these reactants and further increases adhesion. While this prior art composition utilizes a combination of silica, a methylene donor, a methylene acceptor and a sulfur-functional silane, it does not teach the pre-treatment of a silicate filler with all three chemical additives nor does it teach the utilization of a kaolin clay. Pochert et al. does not teach nor suggest that a combination of resorcinol, hexa and silane with a low surface area clay are particularly useful for improving rubber reinforcement properties such as modulus, tensile strength or tear but are instead useful for improving adhesion properties. One of the principal objects of the present invention was to provide a treated clay filler that provides a high level of modulus reinforcement comparable to that provided by soft carbon blacks and silicas.

In summary, the prior art does not teach the use of methylene donors and acceptors in clay systems. Furthermore, the prior art does not teach the unexpected improvements obtained when these compounds are used in conjunction with a functional silane as a three component clay surface treatment system in terms of providing modulus, tear and improved dynamic properties such as rolling resistance and lower heat build-up. The prior art also fails to recognize the improvements achieved according to the invention in terms of how the form of the reagents and methods of treatment determine treated clay stability and performance thereof.

SUMMARY OF THE INVENTION

Accordingly, it is a first object of the present invention to provide a clay product surface treated with a functional silane, a methylene donor and a methylene acceptor which can be used as a reinforcing filler or extender for elastomeric systems. The treated clay of the present invention is especially well suited to use as a reinforcing filler for natural and synthetic rubbers because the available pendant functional group (an amine or sulfur containing group) on the treated clay chemically reacts with the polymer backbone during the curing process to yield cross-linking between the clay and the polymer. Synthetic rubber, isoprene rubber (IR), nitrile butadiene rubber (NBR), ethylene-propylene rubber (EPDM), styrene butadiene rubber (SBR), neoprene (CR) and polybutadiene rubber (BR) are examples of different elastomers that can be reinforced with the inventive treated clay. The elastomeric systems can be sulfur cured, peroxide cured or metal oxide cured, but are preferably sulfur cured.

Another object of the present invention is to provide treated clay products that yield superior filler reinforcement properties in rubber relative to conventional treated clays (like the various Nucap® and Nulok® clays). The performance benefits to be provided include higher tensile strength, modulus and tear properties, lower rolling resistance, lower heat build-up or improved compression set depending on the particular clay/silane combination used with a given natural or synthetic rubber polymer. Hence, a further object of the invention is to provide high performance treated clays having the ability to totally or partially replace soft carbon black or silica fillers in various elastomeric applications on a cost/performance basis. The ability to provide carbon black-like performance properties in white or non-black rubber applications is greatly desired. Yet another object of the invention is to provide treated clay products of high performance for use in sulfur cured and in metal oxide cured elastomer systems.

Another object of the present invention is to provide a method of making a multi-component surface treated clay product that is useful for high performance elastomeric systems.

A still further object of the present invention is an enhancement of the treatment of the clay using the methylene acceptors and donors and silane by using the minimal amount of a dispersant so as to affect caly slurry fluidity for processing while also maintaining a more positive overall surface charge value.

One further object of the invention is to provide a rubber formulation, particularly a tire carcass, a tire wire belt coat, a tire apex, radiator hose, V-belt, innertube, or tire tread formulation, using the treated clay product of the invention.

The clay starting material can be in the form of an aqueous slurry, a dry clay or a wet crude clay for multi-component treatment. For slurry treatment, it is preferred that the clay be in the form of a dispersed filter cake slurry of essentially neutral pH when treated with the three reagents of this invention. Preferably, at least the desired silane is in the form of an aqueous emulsion when added to the clay slurry to insure proper dispersion upon mixing with the clay so as to yield good surface treatment uniformity. For dry clays, it is preferred that the dry clay be charged to a solids/liquid mixer followed by addition of the three surface reagents under vigorous mixing conditions. For wet crude clays having a moisture content of about 20%, it is preferred that the crude clay is first pulverized to a small aggregate size and then conveyed into a mixer such as a pin mixer for combining with the three surface reagents prior to drying, milling and air classifying to a finished product. In both cases, at least the silane is again preferably in the form of an aqueous emulsion when mixed with the clay (dry or wet crude form) to insure proper wetting of the clay's surface with the treatment agent so as to yield good surface treatment uniformity. Finally, the ability to homogeneously treat waterwashed kaolin clays in slurry or dry clay form with such silane emulsions and the methylene donors and acceptors is another object of this invention.

Other objects and advantages of the present invention will become apparent as a description thereof proceeds.

In satisfaction of the foregoing objects and advantages, the present invention, in its broadest embodiment, comprises a hydrous kaolin clay surface treated with a functional silane in an amount between 0.1 and 5.0 by weight based on dry clay, a methylene donor in an amount between about 0.1 and 5.0% by weight based on dry clay and a methylene acceptor in an amount between about 0.1 and 5.0% by weight based on dry clay. Preferably, the functional silane is a sulfur functional silane. The hydrous kaolin clay is one of a waterwashed kaolin clay having a fine particle size, or an air-float fine particle size clay.

The methylene acceptor is preferably resorcinol with the methylene donor being preferably hexamethylenetetramine.

In one method aspect of the invention, a hydrous kaolin clay slurry feed stock is prepared for the surface treatment with the functional silane, methylene donor and methylene acceptor by the steps of first obtaining a crude clay, preferably a crude kaolin clay. The crude clay is formed into a clay slurry via high shear blunging wherein a dispersant is utilized, preferably an inorganic dispersant. The dispersant amount is minimized/controlled to obtain a more positive zeta potential, e.g. preferably more positive than −22 millivolts, and more preferably, more positive than −16 millivolts when measured at a pH of 7 using zeta potential determination methods. In this way, the clay of the slurry has improved performance when treated according to the invention and used with elastomeric compounds. The inorganic dispersant is preferably sodium silicate, tetrasodium pyrophosphate, sodium tripolyphosphate, or sodium hexametaphosphate and ranges between 0 and 1.0% by weight based on dry clay. The clay slurry can be further beneficated to a dry form, e.g. degritted and fractionated and surface treated with the functional silane, methylene donor and methylene acceptor to form the treated clay product. Other known techniques can be used to prepare the clay for treatment.

In another method aspect of the invention, the treated clay product is made by the steps of providing a crude clay and beneficating the crude clay to form a fine particle size clay. The fine particle size clay is surface treated by combining it with a functional silane, methylene donor and methylene acceptor to form the treated clay product. The surface treating step can comprise combining the functional silane, methylene donor and methylene acceptor with either a dry fine particle size clay or a slurry of the fine particle size clay.

The functional silane, methylene donor and methylene acceptor can be in the form of a solution, an emulsion or neat prior to the combining step.

The combining step can entail adding the functional silane, methylene donor and methylene acceptor to the dry clay in a liquid/solids mixer or to the clay slurry. In either case, the treated clay is then dried, preferably dried at sufficiently low temperatures and short residence times so as not to adversely affect the surface treatment on the clay. The surface treatment can be adversely affected by either partial volatilization of at least one of the three surface treatment reagents or by premature-polymer forming reactions between the methylene donor and methylene acceptor. Polymer forming reactions are indicated by darkening of the treated clay color and/or fouling of the process equipment.

In a preferred embodiment, the functional silane and methylene donor are combined together and kept separate from the methylene acceptor prior to their contact with the clay. Separation of the acceptor and donor avoid the possibility of premature reaction therebetween. More preferably, the fine particle size clay, in a slurry or a dry form, is treated with the methylene acceptor and an aqueous emulsion containing both a functional silane and methylene donor.

The treated clays are preferred for use in elastomeric systems requiring high levels of crosslink density (e.g. tensile strength or high modulus).

The treated clays can be used as a total or partial replacement for fillers such as silica or carbon black in elastomeric systems. The amount of treated clay filler employed in a compound will depend on the desired system characteristics such as density, hardness, modulus at 300%, tensile strength, tear, compression set, rolling resistance, heat build-up or the like; however, useful filler loadings for these treated clays in natural or synthetic rubbers typically range from 10–225 parts by weight of treated clay with respect to 100 parts by weight of rubber polymer (i.e., 10–225 phr).

BRIEF DESCRIPTION OF THE DRAWINGS

Reference is now made to the drawings of the invention wherein.

PREFERRED EMBODIMENTS OF THE INVENTION

Figure 1:
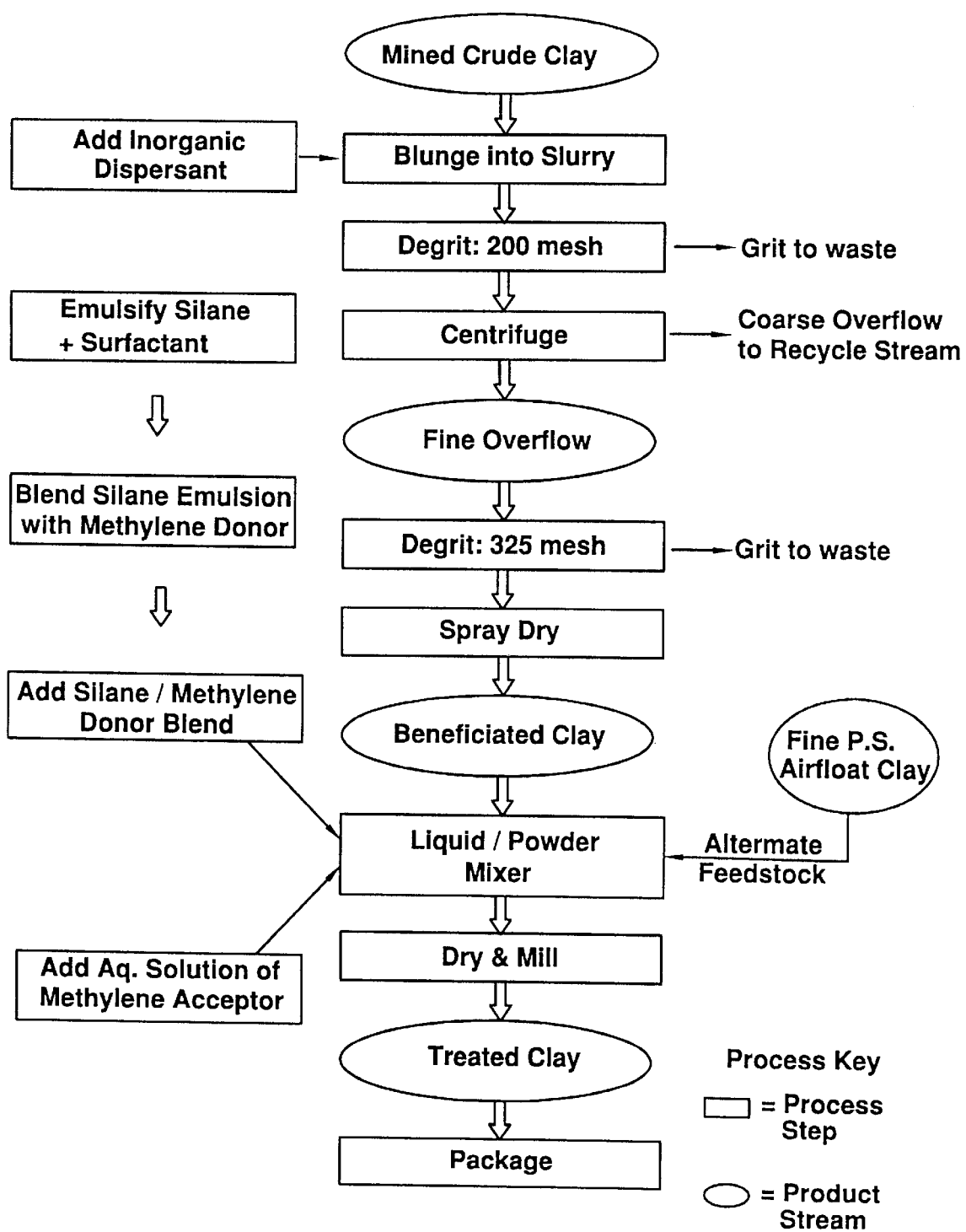
FIG. 1 is a process flow diagram of one embodiment of the inventive method.

In its broadest embodiment, the method of making the inventive treated clay product involves chemically treating the surfaces of the clay mineral particles. This chemical treatment can be performed in a number of ways. The methods of chemical treatment involve both the form of the reagents, i.e., the silane, the methylene acceptor(s) and the methylene donor(s) as well as their order of addition. Further, two reagents can be combined so that only two process streams are required. The form of the clay can also be selected from a dry form, wet crude clay form, or a slurry.

More specifically, the surface treating reagents can be combined in either neat, as a solution, or as an aqueous emulsion to a clay slurry followed by subsequent drying of the mixture to form a powder. Alternatively, the surface treating reagents can be added either neat, as a solution or as an aqueous emulsion to dry clay or wet crude clay in a mixer such as a fluidized bed mixer or a pin mixer followed by subsequent drying as needed to form dry powder. The preferred method of mixing the particular reagent and the clay is one which gives the most uniform coating, is amenable to large-scale processing and is environmentally and economically acceptable.

The following outlines more preferred process conditions which can be utilized with the method described above.

It was found that the preferred method of addition of the functional silane in this invention is to add the silane as an aqueous emulsion to either the dry clay powder followed by oven or fluidized bed drying, or to the clay slurry then spray drying. The silane emulsion yields a uniform clay coating, it is amenable to large-scale processing, and the water diluent is environmentally acceptable.

It was unexpectedly discovered in this invention that clays surface treated with reagents other than silane, such as methylene donors and methylene acceptors, should not be excessively heated as can occur by spray drying the treated clay. For example, when either of these reagents is coated on a clay surface and exposed to excessive heat they can be partially removed from the clay by sublimation, giving low and uncontrollable treatment levels as well as producing undesirable environmental emissions. Also, fouling and discoloring of the equipment can occur when a clay slurry containing a methylene donor and/or methylene acceptor is spray dried at excessive temperatures.

It was found that solutions of methylene donors and acceptors such as hexamethylenetetramine (hereinafter hexa) and resorcinol should not be combined since they are unstable with respect to polymerization. Only the silane and the hexa can be combined to yield emulsions that are stable for extended periods.

Absorbed product moisture in combination with methylene donors and acceptors can yield highly colored treated clay powders which is intensified with heat. Therefore, moisture should be avoided. It was further unexpectedly found that improved aging stability could be obtained by adding the silane and hexa as an aqueous solution or emulsion while adding resorcinol as a dry powder to the clay powder.

A more preferred method for treating a clay powder with these surface reagents is to add an aqueous emulsion of combined silane and hexa, and separately add resorcinol as an aqueous solution or as a solid powder into a fluidized bed of the clay powder followed by moderately low temperature and/or short duration drying.

Referring now to FIG. 1, an exemplary mode of the inventive method is schematically illustrated. This flow sheet describes the inventive process from the source of mined crude clay to the finally packaged treated clay. More specifically, the mined crude clay is blunged into a slurry wherein it is combined with an inorganic dispersant. As will be described in more detail hereinafter, the selection of the inorganic dispersant controls the surface charge of the crude clay which itself controls the performance of the treated clay in its final dry form when used as a reinforcing filler in a rubber composition. The dispersed clay is then degritted and centrifuged to produce the fine overflow clay. The grit from the degritting step is disposed of and the underflow from the centrifuge is recycled.

The fine overflow clay is then degritted again through a 325 mesh screen and spray dried to form a beneficiated dry clay. The beneficiated clay is then introduced into a liquid/powder mixer where it is combined with a two stream reagent flow. One reagent flow combines the silane, prepared in emulsified form with a surfactant, and the methylene donor as a blend. The methylene acceptor. is separately added as an aqueous solution. The silane/methylene donor blend and aqueous solution of methylene acceptor are intimately mixed with the beneficiated dry clay and subsequently dried and milled to form the treated clay. FIG. 1 also shows using a fine particle size air-float clay as the dry clay feedstock to the mixer. It should be understood that FIG. 1 is a preferred mode of the invention and the manner in which the silane, methylene donor and methylene acceptor are combined with the clay can vary.

Table 1 details the intermediate and final physical properties of a fine particle size, Tertiary clay processed in accordance with FIG. 1. The beneficiated kaolin clay described in Table 1 is a particularly well suited feedstock for producing the treated clay products of the present invention and will herein after be referred to as Clay A. Other types of clays described below will be designated in a similar manner, e.g. Clay B, Clay C, etc. s

TABLE 1

Kaolin Clay Physical Properties

| Sample Description: | Crude Tertiary Clay | Centrifuged Overflow Clay | Beneficiated Dry Clay | Treated Dry Clay[1] |
|---|---|---|---|---|
| Sp. Gr. of PIGMENT | 2.60 | 2.60 | 2.60 | 2.60 |
| Malvern Part. Size (med.), $\mu$ | 2.32 | 1.70 | 1.25 | — |
| Malvern Sp. S.A., $M^2/GM$ | 2.9756 | 3.5574 | 3.9349 | — |
| Malvern Pres. # & mm Lens; Dispersion Method: | 0907 45 mm sodium silicate | 0907 45 mm sodium silicate | 0907 45 mm sodium silicate | — |
| % $TiO_2$ | 1.83 | 1.80 | — | — |
| % $Fe_2O_3$ | 1.10 | 1.10 | — | — |
| % $Al_2O_3$ | 38.70 | 38.51 | — | — |
| % $SiO_2$ | 45.52 | 45.28 | — | — |
| % $Na_2O$ | 0.204 | 0.107 | — | — |
| % $K_2O$ | 0.209 | 0.203 | — | — |
| % CaO | 0.024 | 0.024 | — | — |
| BET S. A., $m^2/g$ @ 130° | 21.63 | 22.13 | 23.95 | 24.11 |
| BF Visc. (20 rpm), cps @ as-is % Solids | 32.5 | 21.5 | N.A. | N.A. |
| Hercules visc., Dynes/RPMs | 0.4/1100 | 0.4/1100 | -- N.A. - | N.A. |
| Sedigraph | 1.0 | 0.9 | 0.9 | |

TABLE 1-continued

Kaolin Clay Physical Properties

| Sample Description: | Crude Tertiary Clay | Centrifuged Overflow Clay | Beneficiated Dry Clay | Treated Dry Clay[1] |
|---|---|---|---|---|
| particle size, % +10$\mu$ | | | | |
| % +5$\mu$ | 1.9 | 1.6 | 1.7 | |
| % -2$\mu$ | 93.8 | 93.4 | 93.6 | |
| % -1$\mu$ | 88.0 | 88.4 | 88.8 | |
| % -0.5$\mu$ | 77.1 | 77.6 | 80.0 | |
| Slurry % Solids | 59.93 | 37.5 | N.A. | N.A. |
| Brightness | 80.30 | 73.73 | 74.26 | 71.50 |
| Residue, % +325 Mesh | 24.4 | 0.014 | .004 | 0.0042 |
| pH at as-is % Solids | 7.10 | 5.2 | 5.8 | 8.6 |

[1]Particle size analyses are not report for the treated clay since the treatment interferes with the analyses.

The functional silanes intended for use with the inventive method are silicon-containing compounds which include, within a single molecule, one or more hydrolytic groups which generate silanol groups which can form covalent bonds with the surface hydroxyls of the kaolin clay by means of condensation, and a functional group which can form bonds with surrounding organic matrices. The above-mentioned hydrolytic group can be a methoxyl group, an ethoxyl group or the like. Typically, the functional silanes of greatest utility in this invention will contain 2 or 3 alkoxy type groups. These alkoxy groups are hydrolytically decomposed in the presence of water, (e.g., water contained in the kaolin clay slurry or moisture adhering to the surface of the kaolin clay) thereby forming silanol groups and liberating the corresponding alcohol. The functional silanes modify the surface of the kaolin clay by means of chemidal bonds which these silanol groups form with the surface hydroxyls of the kaolin clay. The above-mentioned functional group can be an amino group, a mercapto group, a thiocyanato group, a bridging tetrasulfane group, or other sulfur functional groups. Additionally, the silane may have an alkyl group such as a methyl group, an ethyl group or a propyl group.

Silanes which contain at least an amine group or a sulfur atom, such as mercaptosilane, thiocyanatosilane, and disilyl tetrasulfane are preferable for use in the production method of the present invention. After the silane has been mixed into the kaolin clay, a silane-treated clay is obtained when the resulting silanol groups reach the kaolin silicate layer to undergo a chemical reaction with the surface hydroxyls of the kaolin clay. Then, pendant amino groups, mercapto groups, thiocyanate groups, or tetrasulfane groups provided on the surface of the silane-treated clay are able to form a bridging, cross-linking reaction with rubber and the like when cured. Consequently, the treated clay has a good affinity towards rubber, thus having exceptional strength with respect to rubber and the like.

Examples of functional silanes for use with the invention are the mercaptosilane and thiocyanatosilane types represented by the following Formula 1, the disilyl tetrasulfane type represented by the following Formula 2, and the aminosilane type represented by the following formula 3:

$$(RO)_2R'—Si—X \qquad (1)$$

(wherein R represents a methyl group or an ethyl group, R' represents a methyl group, an ethyl group, a methoxyl group or an ethoxyl group, and X represents a 3-mercaptopropyl group or a 3-thiocyanatopropyl group)

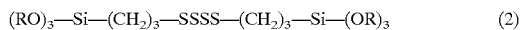

$$(RO)_3\text{—Si—}(CH_2)_3\text{—SSSS—}(CH_2)_3\text{—Si—}(OR)_3 \quad (2)$$

(wherein R represents a methyl group or an ethyl group)

$$(RO)_2R'\text{—Si—Y} \quad (3)$$

wherein R represents a methyl group or an ethyl group, R' represents a methyl group, an ethyl group, a methoxyl group or an ethoxyl group, and Y represents a 3-aminopropyl group or a 3-aminopropyl-2-aminoethyl group.

A specific example of a suitable mercaptosilane is 3-mercaptopropyltrimethoxysilane, a specific example of a suitable thiocyanatosilane is 3-thiocyanatopropyl-triethoxysilane; specific examples of suitable aminosilanes are 3-aminopropyltriethoxysilane and N—[3-(trimethoxysilyl)propyl]ethylenediamine, and a specific example of a disilyltetrasulfane is bis(3-triethoxysilylpropyl)tetrasulfane.

Many silanes, particularly the above-mentioned thiocyanato and tetrasulfane silanes, are generally difficult to dissolve or disperse in water because of their organophilic nature. As a result, it is preferred to emulsify these silanes in water by means of high speed dispersion with surfactants and then mix the emulsified silanes with kaolin clay, the silanes can therefore be more intimately mixed with the clay particles and made to uniformly coat and adhere to the surface of the kaolin clay for subsequent bonding upon drying (the clay particles themselves being inherently hydrophilic in nature). As a result, the surface of the kaolin clay is uniformly surface-treated, so that the treated clay product has exceptional quality and uniformity.

With the present invention, the silanes are preferably high speed dispersed in water with the aid of surfactants and then mixed with the clay in this state, either with or without a methylene donor. The silanes are emulsified into water containing surfactants, which behave as wetting agents and emulsifiers. As surfactants for use in this case, it is preferable that the surfactants have HLB (hydrophilic/lipophilic balance) values of 8–18. Non-ionic surfactants are especially preferable for producing these emulsions. Non-ionic surfactants allow silanes to be easily dispersed in water and form particularly stable silane emulsions wherein it is believed that the functional silane is in a partially hydrolyzed form. The formation of stable silane emulsions is particularly advantageous because premature self-condensation of the partially hydrolyzed functional silane into silicone-like oligomers has been frequently noted to decrease the expected reinforcing benefits of the silane treatment. It should also be noted that the pH at which the silane/non-ionic surfactant emulsion was prepared is very important to resultant silane emulsion stability as the hydrolysis of alkoxy based silanes are well known to be acid or base promoted. Additionally, the presence of residual non-ionic surfactants in the finished treated clay product will not affect the processability or quality of the rubber. Non-ionic surfactants include ether-types and ester types which have polyoxyethylene or polyhydric alcohols and the like as their hydrophilic groups. Examples of nonionic surfactants are polyoxyethylene alkyl ethers, polyoxyethylene fatty acid esters, polyoxyethylene alkylphenyl ethers, polyhydric alcohol fatty acid esters, and polyoxyethylene polyhydric alcohol fatty acid esters.

More specific examples of suitable non-ionic surfactants are polyoxyethylene alkyl ethers such as ethoxylated tridecyl alcohol, polyoxyethylene alkylphenyl ethers such as 9-EO ethoxylated nonylphenol, 15-EO ethoxylated nonylphenol, 20-EO ethoxylated nonylphenol and 20-EO ethoxylated octylphenol; polyoxyethylene polyhydric alcohol fatty acid esters such as 5-EO ethoxylated sorbitol mono-oleate and PEG-20 sorbitol monolaurate, PEG-12 dioleate, and PEG-16 hydrogenated castor oil. These non-ionic surfactants have HLB values of 8–18.

These non-ionic surfactant compounds which have oxyethylene bonds (—$CH_2CH_2O$—) as hydrophilic groups leave residues of approximately 10 ppm–5000 ppm in the finished treated clay. These surfactant amounts are small enough not to influence the quality of the clay filled rubber compositions. Typically, the amount of non-ionic surfactant used to prepare a 50% active emulsion of an organosilane is about 5% by weight of the total silane content. With regard to the present invention, compounds having oxyethylene bonds refer to non-ionic surfactants having oxyethylene bonds or reactants of these non-ionic surfactants with silanes.

The methylene donor can be any known type in the art such as hexamethylenetretramine, paraformaldehyde, trioxane, 2-methyl-2-nitro-1-propanal, substituted melamine and glycoluril cross linking agents or butylated urea-formaldehyde resin cross linking agents. The more preferred methylene donor is hexamethylenetetramine.

The methylene acceptor can also be any known type in the art. Examples of these includes resorcinol, catechol, hydroquinone, pyrogallol, phloroglucinol, 1-naphthol, 2-naphthol and resorcinol-formaldehyde resins. The more preferred methylene acceptor is resorcinol.

In combining the functional silane, methylene donor and methylene acceptor, it is preferred to use the treatment amounts shown in Table 2 which are based on a weight percentage of the reagent in terms of dry clay.

TABLE 2

Reagent Treatment Levels on Clay

| Reagent | TL | Preferred TL | More Preferred TL | Most Preferred TL |
|---|---|---|---|---|
| Functional Silane | 0.1–5% | 0.2–2% | 0.8–1.0% | 0.9% |
| Methylene Donor (e.g., hexa) | 0.1–5% | 0.2–1% | 0.4–0.6% | 0.5% |
| Methylene Acceptor (e.g., Resorcinol) | 0.1–5% | 0.2–1% | 0.4–0.6% | 0.5% |

When added to clay as a solution the methylene acceptor's concentration in the solution ranges preferably between 5% and 50%. When adding the methylene donor either as a solution, emulsion or combined with silane in solution or emulsion form, the concentration of the donor ranges between 5% and 50%.

The pure theoretical chemical composition of hydrous kaolin clay can be represented by the formula $Al_2O_3 \cdot 2SiO_2 \cdot 2H_2O$, and its specific gravity is approximately 2.60. It should be noted that kaolin clay is the mineral kaolinite and being a naturally occurring mineral substance it contains other ingredients in small but varying amounts. There is no particular restriction on the type of kaolin clay to be used in the production method of the present invention. However, it is preferable that sedimentary clays such as kaolin clay from the Tertiary clay layer in Georgia, or a clay layer in South Carolina be used. These kaolin clays result in treated clays which have especially good reinforcing effects with respect to rubber. Aside from having specific physical properties, these sedimentary clays have excellent particle size and shape characteristics and result in highly workable rubber compositions.

Generally, kaolin clays have a unique chemical composition, unique chemical properties and unique particle size and morphology depending upon the origin thereof.

Fine particle size waterwashed kaolin clays taken from the Tertiary layer in east Georgia can be treated according to the invention. This type of clay, herein referred to as Clay B, has a median Malvern particle size of 0.4–1.0μ and a BET surface area of 19–23 m²/g. Additionally, a Sedigraph particle size analysis shows that the treated clay has a particle size distribution such that particles having particle sizes of greater than 5μ make up less than 3% by weight, particles having particle sizes of less than 2μ make up over 90% by weight, particles having particle sizes of less than 1μ make up over 80% by weight, particles having particle sizes of less than 0.5μ make up over 70% by weight, and particles having particle sizes of less than 0.2μ make up less than 50% by weight of the treated clay. A fine particle size clay is usually referred to as one having particle sizes wherein 90% by weight are less than 2μ.

Air-float kaolin clay taken from South Carolina crudes can be treated according to the invention. This type of clay, herein referred to as Clay C, has a median Malvern particle size of 1.9–2.9μ and a BET surface area of 22–26 m²/g. Additionally, a Sedigraph particle size analysis shows that the treated clay has a particle size distribution such that particles having particle sizes of greater than 5μ make up less than 8% by weight, particles having particle sizes of less than 2μ make up over 80% by weight, particles having particle sizes of less than 1μ make up over 70% by weight, particles having particle sizes of less than 0.5μ make up over 60% by weight, and particles having particle sizes of less than 0.2μ make up less than 50% by weight of the treated clay.

The Malvern particle size measurement method is a laser light scattering method, wherein the particle size properties of kaolin clay are determined on dilute aqueous dispersions and the data is analyzed on the basis of Mie scattering and Fraunhofer diffraction theory. The Malvern median particle size values reported herein were measured using Malvern's Mastersizer/E particle size unit.

The Sedigraph particle size measurement is a particle sedimentation method based on Stokes Law, wherein the particle size properties of kaolin clay are determined on dilute aqueous dispersions. The sedimentation data is collected and analyzed by a Micromeritics 5100 X-ray Sedigraph particle size instrument.

The kaolin clay feedstock can be processed in any known and conventional mineral processing scheme for subsequent coupling with the silanes, methylene donors and methylene acceptor disclosed herein. In one instance, the kaolin clay feed can be produced from the known waterwashing process to form a fine particle size clay of essentially neutral pH. In waterwashing, the crude clay is made into a slurry using chemical dispersants and then, fractionated or classified to remove unwanted material, and to divide the clay into the desired particle size. The fractionated clay slurry is then subjected to any number of chemical purification/grinding techniques to remove impurities and increase the clay brightness to the desired brightness level. After filtration, the beneficiated clay filter cake is redispersed at a neutral pH for subsequent product use. Since this waterwashing technique is well recognized in the art, a further description thereof is not needed for understanding of the invention. Preferably, the kaolin clay feed is produced from a waterwash process in accordance with that previously disclosed in FIG. 1, whereby the dispersant level is minimized to control the surface charge of the clay particles.

Alternatively, the kaolin clay to be combined with the silane, methylene acceptor and methylene donor can be an air-float type. Air-float clay is obtained by crushing crude clay, drying it and air classifying it to remove unwanted materials and to achieve a particular particle size.

It should be understood that the kaolin clay starting material for treatment can be processed according to the techniques described above or any other known techniques in the clay industry. Likewise, although specific clay compositions are disclosed herein below, any known kaolin clays are deemed usable for the inventive multi-component treatment, treatment process and elastomeric applications.

Although a conventional waterwash process can be used to produce a kaolin clay feed stock for clay treatment, it has been discovered that improved physical reinforcement properties in a filler-containing rubber composition are achieved when the surface charge of the crude clay being processed is controlled. Referring again to FIG. 1, the mined crude clay is blunged into a slurry. In prior art processes, it is typical to add dispersants when producing the blunged slurry to increase the pH to achieve neutralization of the charge on the clay. However and contrary to that which is known in the art, it has been discovered that improved results occur when the charge of the clay is controlled through the use of particular dispersant types and/or by minimizing the dispersant amounts employed. As determined by zeta potential measurements, clay in its natural mined state has an overall net negative surface charge which is made up of both positive and negative charges. Depending on the type of crude clay, some crudes may have more positive charge on the clay particles than others thereby decreasing the overall negativity of the surface charge. By minimizing the overall negative charge through control of the dispersant type and amount added to the crude clay, more positive charges remain on the clay platelets. The increase in positive charges results in an overall decrease in the negativity of the surface charge.

By minimizing the amount and/or the type of the dispersants used during the crude clay processing, the clay remains more cationic which contributes to the improvements in clay performance when the clay is subsequently surface treated according to the invention and used as a reinforcing filler in elastomeric systems. Inorganic dispersants are preferred over organic dispersants such as sodium polyacrylates. Acceptable inorganic dispersants include sodium silicate, tetasodium pyrophosphate, sodium tripolyphosphate, sodium hexametaphosphate and similar phosphate salts.

In order to verify the effect of the dispersant on clay performance in rubber, different types of dispersant levels were used during the blunging of a crude clay into a slurry. The crude clay was then processed according to the invention with functional silane, methylene acceptor and methylene donor and used in an isoprene rubber formulation. An in-house screening compound comprising a polyisoprene rubber formulation (hereinafter designated "Natsyn™ 2200") is listed in Table 3 below and is used in most all of the experiments conducted to optimize the reagents, treatment levels and process of the present invention unless otherwise noted. Rubber compounding, sample preparations and sample testing were carried out in accordance with ASTM procedures. The rubber compounds whose formulations are shown in the tables were singled-passed, laboratory productions, mixed in a BR size Banbury™ internal mixer with the ingredients added in the order shown. The rubber compounds were weighed to fill 75% of the 2.6 lb. maximum fill volume of the BR mixer. The rubber compounds were finalized on a two roll lab mill.

Compression molding of the test pieces were carried out at 40 tons pressure and 160° C. Cure times were determined by calculating the T90 optimum cure times which were measured on a Monsanto R-100 rheometer at 160° C. Cure times were determined by calculating the T90 optimum cure times which were measured on a Monsanto R-100 rheometer at 160° C and 3° arc. Typically, the inventive treated clay products were substituted for carbon black/silica to maintain approximate durometer hardness, e.g. 1.6 phr of treated clay for every 1.0 phr of carbon black. It should also be understood that the various formulations were not optimized in terms of altering/changing various formulation components in order to obtain the optimum cure times, etc. Designation of the various clays used in the following examples references the type of crude clay form used in the following Tables, e.g., the fine particle size Tertiary Clay A. The types of functional silanes and their designations as used in the Examples are: 3-mercaptopropyltrimethoxysilane (HS-Si); 3-thiocyanatopropyltriethoxysilane (NCS-Si); bis(3-triethoxysilypropyl) tetrasulfane ($S_4$-Si); and 3aminopropyltriethyoxysilane ($H_2$N-Si). In addition, for remaining examples, if not stated, percentages are weight percentages on a dry clay basis.

TABLE 3

Natsyn 2200 Screening Formulation

| INGREDIENT | Phr |
|---|---|
| Unvulcanized IR Rubber | 100.00 |
| Filler | 75.00 |
| Polyethylene 617A | 2.50 |
| Terpene phenol resin | 2.00 |
| Stearic Acid | 2.00 |
| Zinc Oxide | 5.00 |
| Sulfur | 1.60 |
| N-tert-butyl-2-benzothiazyl sulfenamide | 1.60 |
| Zinc-di-n-butyl-dithiocarbamate | 0.50 |
| Diphenylguanidine | 0.50 |
| Benzoic Acid | 1.00 |
| TOTAL | 191.70 |

Table 4 shows a comparison of the treated clay product of FIG. 1 when using Clay A as the mined crude clay and when prepared with two different levels of an inorganic dispersant and one type and level of an organic dispersant. The levels of dispersants are indicated in the tables as wt/wt percent on an active basis. Active basis refers to pure dispersant which does not include any solvent or diluent. The best performing dispersant was the inorganic dispersant, sodium silicate, particularly when used at the lower concentration. The sample prepared with 0.32% sodium silicate in Table 4 gave the highest tensile, modulus and tear die values as compared to the higher concentration sodium silicate sample or the organic sodium polyacrylate dispersant. Quite surprisingly, the inorganic dispersant used at the lower concentration level led to a better treated clay performance than the organic dispersant having a concentration lower than the inorganic dispersant.

TABLE 4

Comparison of Inorganic and Organic Dispersants
4A. Prepared with 0.32% inorganic sodium silicate
4B. Prepared with 0.65% inorganic sodium silicate
4C. Prepared with 0.19% organic sodium polyacrylate
Natsyn 2200 Screening Formulation

| Compound Identification | 4A | 4B | 4C |
|---|---|---|---|
| Rheometer (T = 90%) (min.) | 4:56 | 5:04 | 5:32 |
| Durometer (Shore A) (pts) | 64 | 64 | 64 |
| Tensile (psi) | 3700 | 3280 | 3340 |
| Elongation, % | 430 | 410 | 430 |
| Modulus (psi) | | | |
| @ 100% Elongation | 730 | 750 | 680 |
| @ 200% Elongation | 1630 | 1560 | 1440 |
| @ 300% Elongation | 2430 | 2280 | 2150 |
| Tear Die "C" (pli) | 422 | 407 | 399 |

Table 5 compares two inorganic dispersants, sodium silicate and tetrasodium pyrophosphate (TSPP). These two inorganic dispersants were further evaluated for their effects on rubber performance when used to disperse and process Clay A according to FIG. 1. Sodium silicate performed better than TSPP as can be seen in the tensile, modulus and tear die values. Since tensile strength is often proportional to clay filler particle size, the high tensile strength for sodium silicate suggests that this dispersant more efficiently disperses Clay A. Also, lower amounts of dispersant appear preferable by comparing 5A versus 5B and 5C versus 5D.

TABLE 5

Inorganic Dispersants
5A. 0.2% sodium silicate
5B. 0.25% sodium silicate
5C. 0.15% TSPP
5D. 0.35% TSPP
Natsyn 2200 Screening Formulation

| | 5A | 5B | 5C | 5D |
|---|---|---|---|---|
| Durometer (A) | 65 | 65 | 64 | 64 |
| Tensile (psi) | 3670 | 3530 | 3050 | 3060 |
| Elongation, % | 390 | 400 | 400 | 400 |
| Modulus (psi) | | | | |
| @ 100% Elongation | 870 | 830 | 740 | 700 |
| @ 200% Elongation | 1750 | 1690 | 1440 | 1340 |
| @ 300% Elongation | 2580 | 2480 | 2150 | 2040 |
| Tear Die "C" (pli) | 371 | 362 | 328 | 325 |

Figure 2:
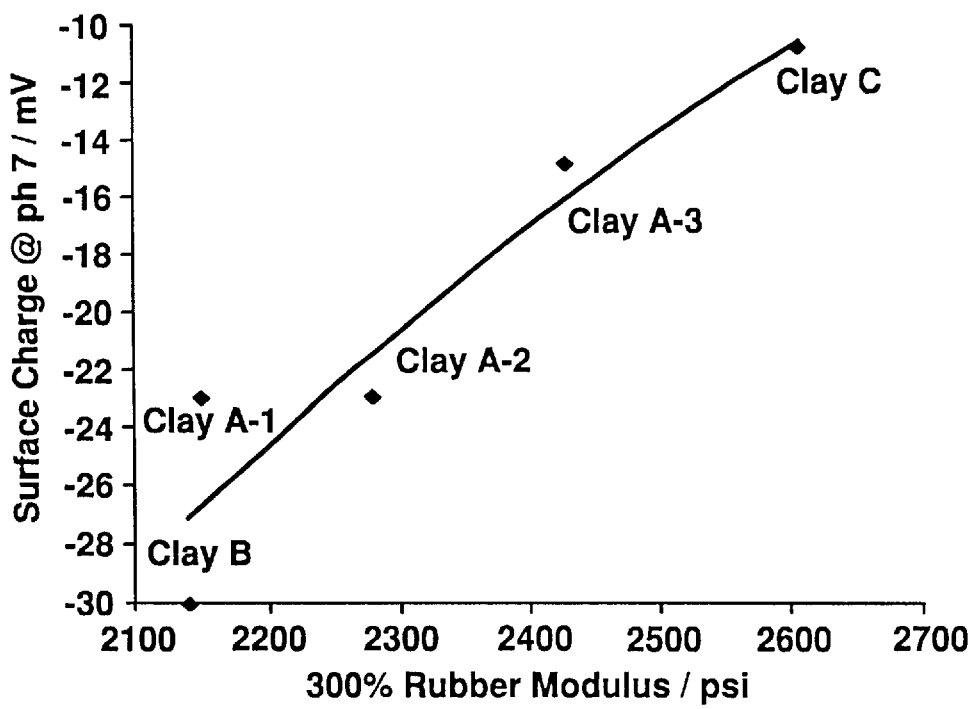
FIG. 2 is a graph relating clay surface charge to rubber modulus for clays having different dispersant treatments.

Referring to FIG. 2, the rubber performance of a treated clay was found to be sensitive to the clay's surface charge. FIG. 2 demonstrates that the more positive surface charge values, i.e., less negative values, gave higher 300% modulus values. The surface charge, itself, is a function of the type of clay, the type of dispersant, and the amount of dispersant. Clay B in FIG. 2 is an east Georgia waterwashed, fine particle size kaolin clay. Clays A1–A3 correspond to Clay A with different dispersants/levels. Clay C is a South Carolina fine particle size air-float clay. As is clearly evident from FIG. 2, significant improvements are seen in rubber modulus when the surface charge of the clay is made less negative (more positive) by using less dispersant and/or an inorganic dispersant. Preferably, the amount of dispersant is selected so that the clay's surface charge is more positive than −22 millivolts as measured at a pH of 7 by zeta potential determination. The surface charge measurement is made after the crude clay is blunged with the dispersant, degritted, fractionated and degritted again, see FIG. 1. More preferably, the dispersant amount is controlled to obtain a zeta potential more positive than −16 millivolts and more preferably −12 millivolts, measured as described above. Zeta potentials reported herein were measured using a Malvern Zetasizer Model 4. Since zeta potential measurement techniques by electrophoretic mobility are well known, a further description thereof is not needed.

When treating slurries of waterwashed kaolin clays, addition of the functional silanes is best accomplished by using an aqueous silane emulsion. When silane treating an air-float clay, it is preferred to use a dry solids/liquid mixing device such as a ribbon blender, pin mixer, Littleford blender, etc., to mix the dry clay with the silane emulsion. The functional silanes are added to the dry clay solids in emulsified form under intimate mixing conditions. The methylene donors and acceptors can be combined with the clay and/or the methylene donor can be pre-blended with the silane emulsion as described above. The treated clay product can then be dried to remove residual moisture and pulverized.

Typically, waterwashed kaolin clay products have a fine particle size and high brightness. Air-float clay products can have a fine particle size but are low brightness.

As stated above, the silanes are preferably high speed dispersed into water in the presence of surfactants to form a silane emulsion. In order to efficiently and uniformly disperse the silanes into the water, the fluid mixture containing silanes, surfactants and water should be agitated vigorously. A silane dispersion fluid wherein silanes have been pre-dispersed in surfactant-containing water should be prepared prior to mixing the silanes with the kaolin clay. The concentration of the silanes in the silane dispersion fluid should be 25–60% by weight. Additionally, the amount of surfactant used should be 0.5–10 parts by weight, more preferably 2.0–5.0 parts by weight with respect to 100 parts by weight of the silane. It is preferable that the surfactants employed have HLB (hydrophilic/lipophilic balance) values of 8–18 and various non-ionic surfactants are especially preferable as the surfactants. The above-mentioned silane dispersion fluid is pH-adjusted depending upon the type of silane to enhance emulsion stability, prior to mixing with the kaolin clay.

If the pH of a silane dispersion fluid wherein sulfur atom-containing mercaptosilanes, thiocyanatosilanes or disilyl tetrasulfanes are dispersed in water with a surfactant is adjusted to be alkaline, for example in the pH range of 7.5–10, then the sulfur functional silane emulsion can be stabilized. That is, if the pH of the silane dispersion fluid is alkaline in this way, then the sulfur functional silane can be prevented from being lost by means of silanol self-condensation into silicone oligomers or polymers before reacting with the surface hydroxyls of the kaolin clay.

When the methylene donor and acceptors are added separately from the silane and each other, the silane dispersion fluid is mixed with a kaolin clay powder, or, with a clay slurry wherein the clay has been suspended in water. When the silane dispersion fluid, and the kaolin clay slurry are combined, two miscible fluids are being mixed, thus making it especially easy to uniformly mix together the silane and the kaolin clay. As a result, the required mixing time becomes shorter and the silanes are distributed uniformly on to the surface of the kaolin clay particles. The solids concentration of kaolin clay in the slurry is typically 40–70% by weight but more preferably 50–60% by weight as dispersed clay filter cake slurries are conveniently used.

In treating waterwashed kaolin clays, the addition of a silane emulsion and separate solutions of the methylene donor and methylene acceptor reagents to a clay slurry normally occurs at the dispersed clay filter cake stage. The clay slurry at this point in the waterwash beneficiation process is typically 50–60% solids and has a pH value falling into the range of 6.0–8.0. Addition of the silane emulsion, donor solution and acceptor solution can be handled in one of several ways so long as they are introduced to the dispersed clay slurry under good mixing conditions (e.g., via a Cowles mixer or in-line mixer injection). After mixing the treated clay slurry for a sufficient time to achieve good treatment uniformity, the product is then dried.

In the case of treating an air-float clay, this is best accomplished through the use of a dry solids/liquid mixing device (such as a ribbon blender, pin mixer, Littleford blender, etc.). The functional silanes are again best applied in emulsified form. The methylene donor and acceptor reagents are added as separate reagent solutions or the methylene donor can be pre-blended with the silane emulsion. After intimate mixing of the clay, silane emulsion, and other liquid reagents, the product is then dried to remove residual moisture and pulverized.

In summary, when producing the treated clays of the present invention, the methylene donor can be put in solution and added either directly to the clay or added to the silane emulsion prior to combining with the clay. Alternatively, the methylene acceptor may be added to the dry clay or clay slurry in dry form or as a solution.

Figure 3:
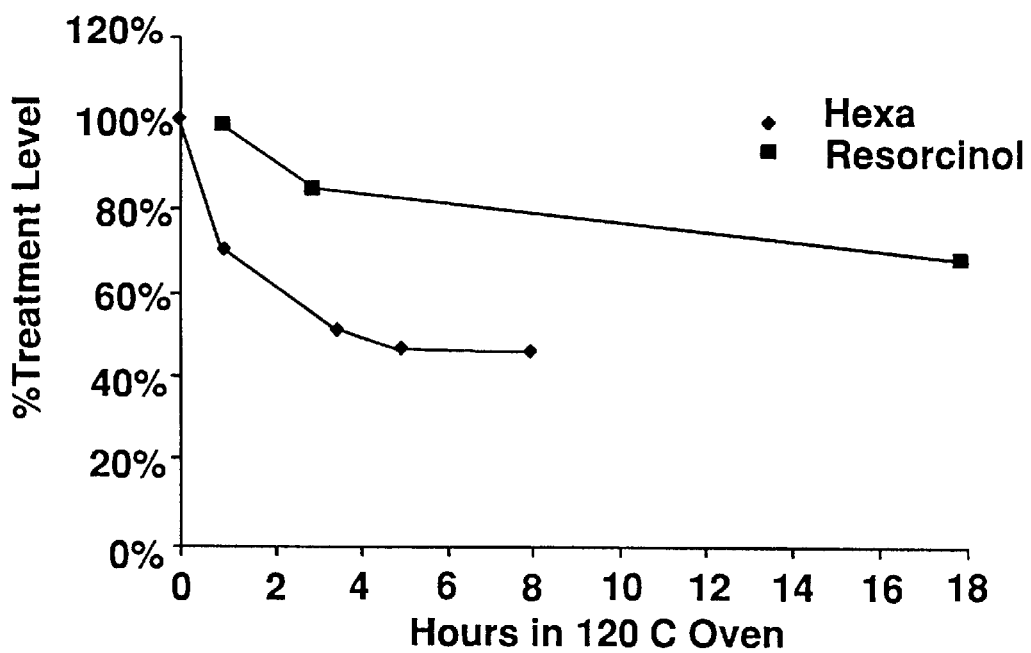
FIG. 3 is a graph relating clay treatment levels over time at elevated temperatures.

As stated above, the treatment level of the functional silane, methylene acceptor and methylene donor can be compromised by both moisture and heat. Excessive heat during the drying step can cause a partial loss of the reagents on the clay surface which then results in lower filler performance levels when the clay is used in a rubber composition. The effect of heat on the treatment level of a surface treated clay is shown in FIG. 3. Clay A was treated with hexa and placed into a 120° C. oven. Samples were removed from the oven at several time intervals and the amount of hexa remaining on the clay was determined by carbon analysis. Clay A was also treated with resorcinol then heated to 120° C. and analyzed in an analogous fashion to the above hexa/Clay A sample. The loss of both hexa and resorcinol in the separate experiments can be seen in FIG. 3 with the loss of hexa being more severe than that of resorcinol.

Figure 4:
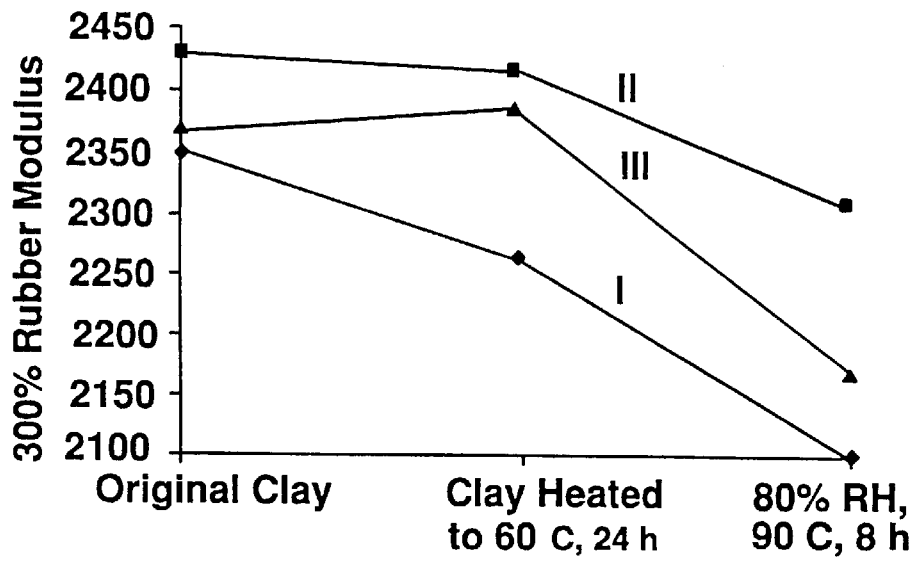
FIG. 4 is a graph relating 300% rubber modulus and treated clay that was aged under different conditions of heat and moisture.

The effect of heat and moisture is shown in FIG. 4. In this figure, the change on rubber modulus is plotted for three different treated clay samples under three different conditions.

The treated clays were prepared by three different methods as follows: 1) Spray drying a slurry containing all three surface treatment reagents and a beneficiated clay (I); 2) Dry blending dry resorcinol powder with spray dried hexa/NCS-Si treated beneficiated clay (II); 3) Dry blending both dry hexa and dry resorcinol with spray dried NCS-Si treated beneficiated clay (III). Each of these samples was then exposed to heat or heat and moisture (80% relative humidity) to determine the process that would yield the most resilient product. This chart indicates that adding dry resorcinol to the spray dried hexa/NCS-Si treated benficiated clay (II) gives the most heat and moisture stable treater product as measured by 300% modulus values.

FIGS. 3 and 4 demonstrate that the surface treated clay should not be dried at an excessive temperature or time. When surface treating a clay in dry form, the preferred maximum drying temperature is believed to be about 75° C., and more preferably, 60° C. Similarly, when spray-drying treated clay slurries, the drying temperature should be such that losses due to volatilization of one or more of the surface treatment reagents should not exceed about 10% by weight of the total treatment amount of the surface reagents as a multi-component system. The drying temperature should also be low enough so as not to cause premature polymer forming reaction between the methylene donor and the methylene acceptor as evidenced by the treated clay product developing an orange-brown hue after drying.

Heat drying the combination of treatment reagents and clay via conventional spray drying or flash-drying causes a chemical reaction between the hydrolyzed silane and the surface hydroxyls of the kaolin clay, thereby resulting in a surface-treated clay by means of a functional silane. Furthermore, heat drying this combination causes the silane treated clay to become. co-modified with a surface coating consisting of a methylene donor and a methylene acceptor thereby bringing these two reagents into close proximity for subsequent polymer forming reaction when the treated clay is compounded into rubber. It is believed that forming said polymer at the clay surface interface is particularly advantageous with respect to enhancing clay filler reinforcement. Finally, heat drying provides the treated clay product in dry powder form. While 10 ppm–5000 ppm of surfactants such as non-ionic surfactants may normally remain in the treated clay when using the silane emulsion of the invention, the amount is sufficiently small as to not have any adverse effects on the physical properties of the clay filled rubber compositions.

While the treated clay of the present invention can be, applied to many different uses, it is suited for use as a filler for synthetic resins such as polyethylene or polypropylene, or as a reinforcing filler or extender for natural or synthetic rubbers. The treated clay of the present invention is especially suited to use as a reinforcing filler for natural and synthetic rubbers because the pendant functional group (an amino or sulfur containing group) provided by the. silane component present on the treated clay chemically reacts with these rubber polymers during the curing process to yield reinforcement via cross-linking between the clay and the polymer. As examples, synthetic rubber, isoprene rubber (IR), nitrile butadiene rubber (NBR), ethylene-propylene rubber (EPDM), styrene butadiene rubber (SBR), neoprene (CR) and polybutadiene rubber (BR) can be given. By adding 10–225 parts by weight of treated clay with respect to 100 parts by weight of natural or synthetic rubber, it is possible to obtain a compound having exceptional mechanical strength. Rubber compositions with this filler loading have excellent physical properties, as well as making rubber products more economical. The treated clay of the present invention enable the making of color pigmented rubber products.

A treated clay to be added to rubber for the purpose of enhancing modulus, tensile strength or tear properties should preferably be a fine dry powder having a clay particle size of at least 90% less than $2\mu$ as determined by x-ray Sedigraph, and a BET surface area of 19–28 m2/g. If the particle size is small and the surface area is large for a treated clay in this way, then it will have good reinforcing strength with respect to rubber.

The inventive treated clays are particularly adapted as a high performance filler in rubber compositions for automotive use, e.g., tire tread formulations, tire carcass formulations, tire wire belt coats, tire apexes, radiator hoses, V-belt, innertubes, or the like. Quite unexpectedly, the uniquely treated kaolin clay of the present invention provides rubber compounds with improved processing properties, improved rubber physical properties and is more economical than silica or carbon black. The inventive treated clay can be processed with rubber compositions in shortened mix cycles than that required for silicas. Similarly, shorter cure times and improved viscosity are realized using the inventive treated clay. Even more unexpectedly, end-use application properties like lower rolling resistance and lower heat build-up in the final product are realized when using the inventive treated clay. Heretofore, the rubber formulation of Table 3 using conventional silane treated clays has only achieved modulus values in the vicinity of 1,500–2,000 psi at 300% elongation. The same rubber formulations using the inventive clay, as will be shown below, shows a significant improvement in physical properties over those containing non-treated or conventional silane treated clays. Furthermore, and equivalent properties are obtained when the inventive treated clay is used as a substitute for silica or carbon black.

While the above-mentioned rubber compositions contain a treated clay and natural or synthetic rubber as necessary components, vulcanizing agents, cross-linking agents, vulcanization accelerators, age resistors, antioxidants, UV absorbents, plasticizers, lubricants, flame retardants, or other fillers such as silica, carbon black, talc, calcium carbonate, alumina trihydrate, mica, zinc oxide, barium sulfate, magnesium oxide, metal silicates, silicas, and combinations thereof and the like can also be added if necessary. Other types of known clay fillers could be used in combination with the above listed components such as those having a silane treatment or untreated clays. Additionally, while there are no restrictions to the method of processing the rubber compositions of the present invention, the desired product can be obtained through calendaring, extrusion molding, compression molding, injection molding or the like.

EXAMPLES

The present invention will be further explained in detail with the use of examples. In the examples, the terms "parts" and "%" always indicate parts by weight and % by weight, respectively.

In order to demonstrate the benefits of combining the functional silane NCS-Si (a thiocyanatosilane) with both the methylene donor and methylene acceptor, a comparison was made with Clay A of Table 1 and various combinations of the reagents. The data in Table 6 show that the use of all three reagents yields the highest performing treated clay. For example, the highest modulus and tear values are exhibited by sample 6H which contains all three reagents. Single reagents or pairs of reagents on the clay surface do not perform as well.

TABLE 6

6A. Clay A
6B. 0.9%/Clay A
6C. 0.5% hexa/Clay A
6D. 0.5% resorcinol/Clay A
6E. 0.9% NCS-Si/0.5% resorcinol/Clay A
6F. 0.9% NCS-Si/0.5% hexa/Clay A
6G. 0.5% hexa/0.5% resorcinol/Clay A
6H. 0.9% NCS-Si/0.5% hexa/0.5% resorcinol/Clay A (Control)
Natsyn 2200 Screening Formulation

| Compound Identification | 6A | 6B | 6C | 6D | 6E | 6F | 6G | 6H |
|---|---|---|---|---|---|---|---|---|
| Rheometer (T-90%) (min.) | 5:05 | 5:30 | 4:38 | 4:14 | 4:52 | 4:54 | 5:10 | 5:21 |
| Durometer (Shore A) (pts) | 59 | 65 | 61 | 61 | 65 | 65 | 62 | 65 |
| Tensile (psi) | 3370 | 3630 | 3240 | 3350 | 3610 | 3670 | 3470 | 3460 |
| Elongation, % | 560 | 460 | 530 | 550 | 470 | 460 | 500 | 430 |
| Modulus (psi) | | | | | | | | |
| @ 100% Elongation | 330 | 710 | 370 | 370 | 680 | 720 | 530 | 760 |
| @ 200% Elongation | 510 | 1410 | 570 | 580 | 1360 | 1450 | 1020 | 1590 |
| @ 300% Elongation | 770 | 2080 | 860 | 870 | 2000 | 2150 | 1550 | 2320 |
| Tear Die "C" (pli.) | 251 | 395 | 256 | 267 | 390 | 404 | 345 | 413 |

Table 7 summarizes the study of four chemically different functional silanes and their effect on filler performance in regard to the inventive treated clay. HS-Si is a mercaptosilane. $S_4$-Si is a tetrasulfanesilane and $H_2N$-Si is an aminosilane. The conclusion is that the sulfur containing silanes (7A, 7B, 7C) perform better than the amino-silane (7D) in this rubber formulation by having higher durometer hardness, modulus, and tear values. The NCS-Si silane performs best of all these silanes in these same categories.

TABLE 7

7A. 0.9% NCS—Si/0.5% hexa/0.5% resorcinol/Clay A
7B. 0.9% HS—Si/0.5% hexa/0.5% resorcinol/Clay A
7C. 0.9% $S_4$—Si/0.5% hexa/0.5% resorcinol/Clay A
7D. 0.9% $H_2N$—Si/0.5% hexa/0.5% resorcinol/Clay A
Natsyn 2200 Screening Formulation

| Compound Identification | 7A | 7B | 7C | 7D |
|---|---|---|---|---|
| Rheometer (T-90%) (min.) | 5:11 | 5:00 | 5:22 | 5:23 |
| Durometer (Shore A) (pts) | 65 | 64 | 64 | 62 |
| Tensile (psi) | 3650 | 3150 | 3460 | 3240 |
| Elongation, % | 440 | 420 | 440 | 470 |
| Modulus (psi) | | | | |
| @ 100% Elongation | 740 | 660 | 690 | 530 |
| @ 200% Elongation | 1580 | 1390 | 1460 | 1050 |
| @ 300% Elongation | 2340 | 2080 | 2160 | 1630 |
| Tear Die "C" (pli.) | 414 | 373 | 403 | 345 |

TABLE 8

8A. 0.9% NCS-Si/0.5% hexa/0.5% resorcinol/Clay A (Treated Clay A*)
8B. 0.9% NCS-Si/0.5% hexa/0.5% catechol/Clay A
8C. 0.9% NCS-Si/0.5% hexa/0.5% hydroquinone/Clay A
8D. 0.9% NCS-Si/0.5% hexa/0.57% pyrogallol/Clay A
8E. 0.9% NCS-Si/0.5% hexa/0.57% phloroglucinol dihydrate/Clay A
8F. 0.9% NCS-Si/0.5% hexa/0.65% 1-naphthol/Clay A
8G. 0.9% NCS-Si/0.5% hexa/0.65% 2-naphthol/Clay A
8H. 0.9% NCS-Si/0.5% hexa/0.9% Penacolite R-2200[1]/Clay A
Natsyn 2200 Screening Formulation

| Compound Identification | 8A | 8B | 8C | 8D | 8E | 8F | 8G | 8H |
|---|---|---|---|---|---|---|---|---|
| Rheometer (T-90%) (min.) | 4:55 | 5:54 | 4:41 | 5:30 | 5:47 | 4:59 | 4:56 | 5:37 |
| Durometer (Shore A) (pts) | 65 | 65 | 65 | 65 | 64 | 64 | 64 | 64 |
| Tensile (psi) | 3420 | 3260 | 3310 | 3280 | 3060 | 3290 | 3440 | 2980 |
| Elongation, % | 420 | 440 | 440 | 440 | 420 | 430 | 440 | 390 |
| Modulus (psi) | | | | | | | | |
| @ 100% Elongation | 730 | 660 | 680 | 670 | 650 | 680 | 680 | 690 |
| @ 200% Elongation | 1570 | 1350 | 1400 | 1370 | 1370 | 1380 | 1400 | 1500 |
| @ 300% Elongation | 2320 | 2000 | 2070 | 2030 | 2050 | 2070 | 2100 | 2260 |
| Tear Die "C" (pli) | 417 | 400 | 407 | 403 | 404 | 406 | 407 | 409 |

[1]Penacolite R-2200 is a resorcinol-formaldehyde resin from Indspec Chemical Corp., Pittsburgh, PA.

Table 8 shows the relative efficacies of various methylene acceptors used in the inventive clay concept. It was found that two methylene acceptors performed particularly well in providing 300% modulus. Both resorcinol (8A) and Penacolite R-2200 (8H) were superior to the others with resorcinol being the preferred reagent. Herewith the embodiment identified as 8A using Clay A and the defined reagents and treatment levels will be referred to as Treated Clay A*.

A variety of methylene donors and other crosslinking agents were evaluated as treatment components in the inventive clay. The rubber performance data of Table 9 show that there is almost an even spread of 300% modulus values from 1950 to 2400 psi. Among the treatment systems evaluated, hexa (9A) and Cymel 370 (9E) yielded the highest modulus values.

TABLE 9

9A. 0.9% NCS—Si/0.5% resorcinol/0.5% hexa/Clay A (Treated Clay A*)
9B. 0.9% NCS—Si/0.5% resorcinol/0.64% paraformaldehyde/Clay A
9C. 0.9% NCS—Si/0.5% resorcinol/0.64% trioxane/Clay A
9D. 0.9% NCS—Si/0.5% resorcinol/0.5% Cymel 3031/Clay A
9E. 0.9% NCS—Si/0.5% resorcinol/0.5% Cymel 3701/Clay A
9F. 0.9% NCS—Si/0.5% resorcinol/0.5% Cymel 1172[1]/Clay A
9G. 0.9% NCS—Si/0.5% resorcinol/0.5% Beetle 80[2]/Clay A
9H. 0.9% NCS—Si/0.5% resorcinol/0.43% 2-methyl-2-nitro-1-propanol/Clay A
Natsyn 2200 Screening Formulation

| Compound Identification | 9A | 9B | 9C | 9D | 9E | 9F | 9G | 9H |
|---|---|---|---|---|---|---|---|---|
| Rheometer (T-90%) (min.) | 4:55 | 5:36 | 4:49 | 5:02 | 5:18 | 5:01 | 4:57 | 5:07 |
| Durometer (Shore A) (pts) | 65 | 62 | 65 | 65 | 64 | 64 | 64 | 65 |
| Tensile (psi) | 3420 | 3380 | 3390 | 3360 | 3350 | 3060 | 3370 | 3160 |
| Elongation, % | 420 | 430 | 460 | 420 | 410 | 390 | 430 | 430 |
| Modulus (psi) | | | | | | | | |
| @ 100% Elongation | 730 | 650 | 660 | 710 | 730 | 690 | 710 | 700 |
| @ 200% Elongation | 1570 | 1460 | 1320 | 1450 | 1610 | 1530 | 1530 | 1390 |
| @ 300% Elongation | 2320 | 2220 | 1950 | 2160 | 2420 | 2300 | 2260 | 2030 |
| Tear Die "C" (pli) | 417 | 408 | 399 | 408 | 420 | 413 | 410 | 406 |

[1]Cymel resins are substituted melamine and glycoluril crosslinking agents from Cytec Industries, West Paterson, NJ.
[2]Beetle 80 is a butylated urea-formaldehyde resin crosslinking agent from Cytec Industries, West Paterson, NJ.

Hexa Concentration Study

The concentration of the methylene donor, hexa, on the clay surface was varied in the inventive clay composition to establish its preferred concentration range. Different hexa treatment concentrations were used in combination with 0.9% NCS-Si plus 0.5% resorcinol and the results are shown in Table 10. Sample 10B through 10E have virtually equivalent filler performance particularly in 300% modulus thereby indicating that hexa has a large concentration latitude for yielding high performance.

TABLE 10

10A. 0.9% NCS—Si/0.5% resorcinol/Clay A
10B. 0.9% NCS—Si/0.5% resorcinol/0.15% hexa/Clay A
10C. 0.9% NCS—Si/0.5% resorcinol/0.25% hexa/Clay A
10D. 0.9% NCS—Si/0.5% resorcinol/0.35% hexa/Clay A
10E. 0.9% NCS—Si/0.5% resorcinol/0.5% hexa/Clay A (Treated Clay A*)
Natsyn 2200 Screening Formulation

| Sample Description | NCS—Si resorcinol only | 0.15% hexa added | 0.25% hexa added | 0.35% hexa added | 0.5% hexa added |
|---|---|---|---|---|---|
| Compound Identification | 10A | 10B | 10C | 10D | 10E |
| Rheometer (T-90%) (min.) | 5:13 | 5:12 | 5:10 | 5:49 | 5:31 |
| Durometer (Shore A) (pts) | 66 | 66 | 66 | 66 | 66 |
| Tensile (psi) | 3270 | 3380 | 3390 | 3300 | 3140 |
| Elongation, % | 440 | 410 | 410 | 400 | 390 |
| Modulus (psi) | | | | | |
| @ 100% Elongation | 750 | 790 | 770 | 770 | 780 |
| @ 200% Elongation | 1450 | 1680 | 1670 | 1670 | 1660 |
| @ 300% Elongation | 2060 | 2460 | 2450 | 2460 | 2400 |
| Tear Die "C" (pli.) | 398 | 411 | 408 | 410 | 407 |

Air-Float Clay Study

Table 11 shows a comparative filler study using a South Carolina fine particle size, air-float kaolin clay (Clay C) which was evaluated as an alternate clay feedstock for producing the treated clay of this invention. The particle size and surface area properties typical of Clay C have been previously disussed. Clay C was surface treated by two different processes. In the first process, the air-float clay was dispersed in water using 0.2% TSPP as a dispersant, then slurry treated with a 50% aqueous emulsion of NCS-Si, and separate solutions of hexa, and resorcinol, then spray dried. This treatment process was performed twice using different treatment levels of the reagents to give Samples 11B and 11C.

The second treatment process in which Clay C was used as a feedstock is shown in FIG. 1 where the dry air-float clay was directly treated with an aqueous emulsion of NCS-Si, plus hexa, and a separate solution of resorcinol in a liquid/powder mixer, then dried and milled (Sample 11D). These three treated air-float clays are compared with the untreated clay control (Sample 11A).

The rubber performance data shown below indicate that the multi-component surface treatment of this invention improves the performance of clays other than Clay A. Further indicated by these data is that surface treatment can be satisfactorily performed by spray drying treated slurries under conditions of minimal heat and residence time. Comparison of the similar performance values for Samples 11B and 11C indicate that there is a broad latitude for the treatment levels of all three reagents which yield high performance compared to the base clay, Sample 11A.

Sample 11D illustrates that undispersed, dry clays, such as air-float clays, can be surface treated directly with minimal beneficiation in a liquid/powder mixer and still obtain large improvements in rubber reinforcement properties over the untreated clay.

TABLE 11

11A. Clay C
11B. Clay C/0.5% NCS—Si/1.0% resorcinol/0.75% hexa; slurry treated, spray dried
11C. Clay C/0.9% NCS—Si/0.5% resorcinol/0.5% hexa; slurry treated, spray dried
11D. Clay C/0.9% NCS—Si/0.5% resorcinol/0.5% hexa; liquid/powder mixer, dried
Natsyn 2200 Screening Formulation

| | 11A | 11B | 11C | 11D |
|---|---|---|---|---|
| Durometer (A) | 58 | 63 | 63 | 63 |
| Tensile (psi) | 3450 | 3470 | 3730 | 3190 |
| Elongation, % | 490 | 390 | 390 | 420 |

TABLE 11-continued

11A. Clay C
11B. Clay C/0.5% NCS—Si/1.0% resorcinol/0.75% hexa; slurry treated, spray dried
11C. Clay C/0.9% NCS—Si/0.5% resorcinol/0.5% hexa; slurry treated, spray dried
11D. Clay C/0.9% NCS—Si/0.5% resorcinol/0.5% hexa; liquid/powder mixer, dried Natsyn 2200 Screening Formulation

|  | 11A | 11B | 11C | 11D |
|---|---|---|---|---|
| Modulus (psi) | | | | |
| @ 100% Elongation | 340 | 820 | 830 | 670 |
| @ 200% Elongation | 530 | 1590 | 1670 | 1250 |
| @ 300% Elongation | 900 | 2440 | 2610 | 1900 |
| Tear Die "C" (pli) | 215 | 374 | 374 | 310 |

In this example, the filler performance of the inventive treated clay was investigated and compared to conventional, prior art silane treated clays and carbon black. The results of this comparison are shown in Table 12 where all fillers were utilized at a loading of 75 phr.

Table 12 indicates that Treated Clay A* (see Table 8) has superior performance in rubber as compared to the prior art silane treated clays identified as Treated Clay B and Hi-Treated Clay B. Clay B is a fine paricle size, water-washed kaolin clay produced from a Tertiary east Georgia crude whose physical properties have been previously discussed. Treated Clay A* has equivalent modulus performance to a soft carbon black which is a high cost alternative.

TABLE 12

Natsyn 2200 Screening Formulation

| Sample Description | Treated Clay B[1] | Hi-Treated Clay B[2] | Carbon Black N-660[3] | Treated Clay A* |
|---|---|---|---|---|
| Rheometer (T = 90%) (min.) | 6:13 | 5:25 | 5:27 | 5:15 |
| Durometer (Shore A) (pts) | 64 | 65 | 75 | 65 |
| Tensile (psi) | 3310 | 3620 | 2710 | 3390 |
| Elongation, % | 470 | 450 | 310 | 360 |
| Modulus (psi) | | | | |
| @ 100% Elongation | 550 | 700 | 960 | 910 |
| @ 200% Elongation | 1100 | 1350 | 2080 | 1780 |
| @ 300% Elongation | 1640 | 2040 | 2630 | 2660 |
| Tear Die "C" (pli) | 319 | 352 | 341 | 367 |

[1]East Georgia fine particle size, high brightness clay (Clay B) treated with 0.4% NCS—Si.
[2]East Georgia fine particle size, high brightness clay (Clay B) treated with 1.00% NCS—Si.
[3]The carbon black filler level was 75.0 phr.

Tire Tread Study

In a further performance comparison, Tables 13 and 14, the inventive treated clay product was successfully used as a substitute for a substantial portion of either carbon black or silica in a rubber tire tread formulation. While these filler studies exemplify substituting as much as 80% of the carbon black or silica, depending on the end use application, the inventive treated clay product can completely replace the carbon black or silica filler.

The data in Table 14 compare carbon black (C. B., earlier tire technology), precipitated silica (Ppt $SiO_2$, current tire technology), and Treated Clay A* for processing performance, general applications performance, and filler performance specific to the Michelin tire tread formulation shown in Table 13. Treated Clay A* was substituted for 70% of Ppt $SiO_2$ in Sample 14C.

There is a large processing advantage to using Treated Clay A* in this formulation over the earlier technologies. This can be seen in the improved values for Banbury mix cycle, rheometer cure time, and Mooney viscosity.

Regarding applications performance, Treated Clay A* also gives superior resistance to heat build-up (see Goodrich flexometer), wear resistance and rolling resistance (see MTS, DMA data).

Durometer hardness, tensile strength, compression set, modulus, and tear die of Sample 14C is equivalent to Sample 14B which contains all Ppt $SiO_2$. Sample 14C has superior performance in these same properties compared to carbon black, Sample 14A.

In summary, the data indicate that Treated Clay A* can be used to replace most of the expensive Ppt $SiO_2$ in the Michelin tire tread formulation to give superior performance as compared to either the pure Ppt $SiO_2$ or carbon black compounds where improved processing, wear resistance; rolling resistance, and low heat build-up are required. Only abrasion and wet traction values were lower which can be rectified by using less clay in the clay based formulation.

TABLE 13

Michelin Tire Tread Formulation

| Ingredients | 14A | 14B | 14C |
|---|---|---|---|
| SBR Solution | | 75.00 | 75.00 |
| SBR Emulsion | 65.00 | | |
| Polybutadiene | 35.00 | 25.00 | 25.00 |
| N-234 C.B. | 80.00 | | |
| Dispersible Pptd. Silica | | 80.00 | 25.00 |
| Clay A* | | | 55.00 |
| N-330 C.B. | | | 4.40 |
| Crossinking agent X 50 S | | 12.80 | 4.00 |
| Aromatic oil | 37.50 | 32.50 | 7.00 |
| Stearic Acid | 1.00 | 1.00 | 1.50 |
| Antozite 67P | 2.00 | 2.00 | 2.00 |
| Sunproof Improved | 1.50 | 1.50 | 1.50 |
| Zinc Oxide | 2.50 | 2.50 | 2.50 |
| Suflur | 1.35 | 1.40 | 1.70 |
| Santocure CBS | 1.35 | 1.70 | 1.70 |
| Diphenyl Guanidine | 1.35 | 2.00 | 1.20 |
| Total | 227.20 | 237.40 | 208.30 |

TABLE 14

| Compound Identification | 14A | 14B | 14C |
|---|---|---|---|
| Specific Gravity | 1.156 | 1.196 | 1.275 |
| Durometer (Shore A) (pts) | 75 | 68 | 67 |
| Tensile (psi) | 2030 | 2240 | 2220 |
| Elongation (%) | 400 | 300 | 320 |
| Compression Set: 22 hrs. @ 212° F. Deflection (%) | 46.5% | 35.3% | 35.8% |
| DeMattia Flexibility (cycles) | 1,000 | 5,000 | 5,000 |
| Banbury Mix Cycle Time (min.) | 5:30 | 6:30 | 5:00 |
| Rheometer (T-90%) (min.) | 9:55 | 13:13 | 9:15 |
| Mooney Viscosity (1 unit = 0.083 Nm) | 195.6 | 148.0 | 97.7 |
| Initial Viscosity (units) ML 1 + 4 (212° F.) (units) | 99.6 | 68.8 | 64.4 |
| Modulus (psi) | | | |
| @ 100% Elongation | 420 | 590 | 830 |
| @ 200% Elongation | 900 | 1310 | 1520 |
| @ 300% Elongation | 1500 | 2220 | 2110 |
| Tear Die "C" (pli.) | 166 | 318 | 336 |
| Goodrich Flexometer | 117.0 | 31.5 | 27.0 |

TABLE 14-continued

| Compound Identification | 14A | 14B | 14C |
|---|---|---|---|
| ΔTemperature (°F.) | | | |
| Static Deflection (%) (stiffness) | 16.73 | 13.22 | 11.67 |
| Dynamic Deflection (%) (stiffness) | 30.42 | 3.15 | 1.59 |
| Dynamic Compression Set (%) | 13.42 | 1.09 | 0.79 |
| NBS Abrasion (abrasive index) | 804 | 762 | 245 |
| Pico Abrasion (Index) | 160 | 118 | 61 |
| MTS Dynamic Testing | | | |
| Tan delta @ −20° C. (↑) | 0.3679 | 0.6399 | 0.7564 |
| Tan delta @ 0° C. (↑) | 0.4423 | 0.5046 | 0.3824 |
| Tan delta @ 60° C. (↓) | 0.3954 | 0.1094 | 0.0882 |
| DMA Testing | | | |
| Tan delta @ −20° C. (↑) | 0.445 | 0.767 | 0.941 |
| Tan delta @ 0° C. (↑) | 0.477 | 0.513 | 0.376 |
| Tan delta @ 60° C. (↓) | 0.501 | 0.160 | 0.134 |

Key: MTS and DMA data
−20° C. = higher the number (↑), the better the wear resistance
0° C. = higher the number (↑), the better the wet traction
60° C. = lower the number (↓), the lower the rolling resistance Tire Carcass Formulation The following example demonstrates the use of alternate sources of clay, the effectiveness of the inventive surface treatment in alternate rubber formulations, and the ability of these high performance clays to replace carbon black in rubber.

The multi-component surface treatment of this invention was tested on an alternate fine particle size, Tertiary east Georgia clay hereinafter referred to as Treated Clay D. Treated Clay D is more coarse and has lower brightness than Clay B, having been degritted but was not fully beneficiated. The Sedigraph particle size distribution of Treated Clay D shows that 90% of particles are less than 2μ. Treated Clay D, was compounded into the tire carcass formulation shown in Table 15. The amounts of Treated Clay D and carbon black were adjusted to maintain constant durometer hardness. The performance is compared to carbon black in Table 16. All of the results of Table 16 show excellent performance, equivalent to a soft carbon black, the industry standard, at significantly lower cost. Thus, Treated Clay D can almost completely replace carbon black at significant cost advantage.

TABLE 15

Tire Carcass Formulation

| Ingredient | 16A | 16B |
|---|---|---|
| Natural Rubber SMR-L | 75.00 | 75.00 |
| SBR 1778 | 34.40 | 34.40 |
| Treated Clay D | 64.00 | — |
| N-660 Carbon Black | 10.00 | 50.00 |
| Circosol 4240 | 5.00 | 5.00 |
| Stearic Acid | 1.00 | 1.00 |
| Wingstay 100 | 1.00 | 1.00 |
| SP 1068 Resin | 3.00 | 3.00 |
| Zinc Oxide | 5.00 | 5.00 |
| Sulfur (Rubber Makers) | 2.50 | 2.50 |
| Benzothiazyl disulfide | 0.85 | 0.85 |
| Diphenyl Guanidine | 0.15 | 0.15 |
| Total | 201.90 | 177.90 |

TABLE 16

16A. Treated Clay D
16B. N-660 Carbon Black

| Compound Identification | 16A | 16B |
|---|---|---|
| Durometer (A) | 53 | 54 |
| Tensile (psi) | 3510 | 3240 |
| Elongation, % | 450 | 430 |
| Modulus (psi) | | |
| @ 100% Elongation | 540 | 400 |
| @ 200% Elongation | 1220 | 1080 |
| @ 300% Elongation | 1910 | 1920 |
| Tear Die "C" (pli) | 350 | 322 |

Treated Clays versus Carbon Black Fillers

The reinforcing performance of Treated Clay B, Hi-Treated Clay B and Treated Clay A* were compared to that of five different carbon blacks in a rubber compound similar to the Natsyn 2200 screening formulation of Table 3. Only the filler loadings differed from the standard Natsyn 2200 formulation wherein the carbon black formulations each contain 50 phr of the indicated carbon black while the clay based formulations contain 80 phr of treated clay to maintain approximate constant hardness. Treated Clay B and Hi-Treated Clay B both represent conventional silane-treated clays, as previously presented in Table 12. The reinforcing performance results are shown in Table 17.

The treated clay samples exhibited relatively high 300% moduli as compared to the carbon black samples. In particular the treated clay of this invention, Treated Clay A*, provides the highest level of reinforcement among the treated clays and exhibits a 300% modulus well above that of any carbon black samples. The carbon black samples' 300% moduli are observed to decrease with increasing particle size. All of the treated clay tensile values are greater than those of the carbon black samples. Also, the clay tear values are greater than any of the carbon black tear values. The Treated Clay A* sample was the most resilient of all samples in accelerated aging performance.

TABLE 17

Carbon Black Samples[1]

| Sample Description | N-330 C.B. | N-550 C.B. | N-660 C.B. | N-754 C.B. | N-990 C.B. |
|---|---|---|---|---|---|
| Rheometer (T = 90%), min. | 4:15 | 4:27 | 4:58 | 5:13 | 5:37 |
| Durometer (Shore A) pts | 68 | 67 | 62 | 61 | 56 |
| Tensile, (psi) | 3040 | 3120 | 3080 | 3060 | 2520 |
| Elongation % | 400 | 440 | 480 | 460 | 540 |
| Modulus (psi) | | | | | |
| @ 100% Elongation | 490 | 580 | 400 | 400 | 230 |
| @ 200% Elongation | 1200 | 1300 | 920 | 920 | 350 |
| @ 300% Elongation | 2060 | 2030 | 1560 | 1570 | 460 |
| Tear Die "C", pli | 370 | 369 | 303 | 306 | 182 |

[1]The formulation is that of Table 3, except that carbon black loadings are 50 phr.

| Clay Samples[2] | | | |
|---|---|---|---|
| Sample Description | Treated Clay B | Hi-Treated Clay B | Treated Clay A* |
| Rheometer (T = 90%), min. | 5:18 | 5:28 | 4:50 |
| Durometer (Shore A) pts | 64 | 65 | 67 |
| Tensile, (psi) | 3480 | 3610 | 3480 |
| Elongation % | 470 | 440 | 400 |
| Modulus (psi) | | | |
| @ 100% Elongation | 590 | 760 | 870 |
| @ 200% Elongation | 1190 | 1520 | 1810 |
| @ 300% Elongation | 1790 | 2230 | 2600 |
| Tear Die "C", pli | 383 | 418 | 418 |

[2]The formulation is that of Table 3, except that clay loadings are 80 phr.

Truck Tire Wire Belt Coat Compound

This example demonstrates that Treated Clay A* can completely replace carbon black in this rubber application where modulus is a critical parameter. A formulation calling for complete substitution of carbon black by the treated clays is shown in Table 18 and the physical testing results are shown in Table 19. While the prior art, silane-treated clays have 300% moduli that are less than that of the N-300 sample, the 300% modulus of Treated Clay A* of this invention is radically higher than either the prior art clays or the N-330 sample. Treated Clay A* also shows significant improvements over the prior art, silane-treated clays in tensile and tear and is close to those observed for N-330.

TABLE 18

Truck Tire Wire Belt Coat Formulation

| Ingredient | phr |
|---|---|
| SMR 5 | 100.00 |
| Carbon Black or Treated Clay | See Table 19 |
| Antioxidant 35 | 1.00 |
| Antozite 67P | 1.00 |
| Stearic Acid | 1.00 |
| Zinc Oxide | 6.00 |
| Cobalt Stearate | 1.80 |
| Insoluble Sulfur | 3.60 |
| Amax | 0.65 |

TABLE 19

| Sample Description[1] | N-330 C.B. 50 phr | Treated Clay B 80 phr | Hi-Treated Clay B 80 phr | Treated Clay A* 80 phr |
|---|---|---|---|---|
| Rheometer (T = 90%), mins. | 5:58 | 8:30 | 8:08 | 9:02 |
| Durometer (Shore A) pts | 66 | 53 | 56 | 59 |
| Tensile, (psi) | 4010 | 3470 | 3620 | 3880 |
| Elongation, % | 560 | 570 | 550 | 460 |
| Modulus (psi) | | | | |
| @ 100% Elongation | 380 | 300 | 360 | 590 |
| @ 200% Elongation | 960 | 660 | 810 | 1360 |
| @ 300% Elongation | 1750 | 1120 | 1350 | 2190 |
| Tear Die "C", pli | 401 | 332 | 370 | 389 |

[1]Clay samples also contain 4.0 phr of N-330 C.B.

Tire Apex Compound

This example demonstrates the performance of treated clays as compared to a carbon black in an SBR formulation on a direct substitution basis without any optimization of the formula in terms of curing rate (Table 20). Treated Clay A* shows significant improvement over the prior art, silane treated clays in modulus though not as high as that provided by N-660 (Table 21). Further improvements can be obtained by optimizing the treated clay compounds to give a tighter cure. All of the treated clay samples exhibit comparable tensile to N-660, but considerably higher elongation and tear. When the loadings of the treated clays are increased to 160 phr to approximate equal durometer hardness, the Treated Clay A* modulus increases dramatically to beyond that for carbon black.

TABLE 20

Tire Apex Compound

| Ingredients | Phr |
|---|---|
| SBR 1500 | 100.00 |
| Carbon Black or Treated Clay | 100.00 |
| Aromatic oil | 5.00 |
| Rosin oil | 5.00 |
| Vanplast R | 2.00 |
| Stearic Acid | 2.00 |
| Zinc Oxide | 4.00 |
| Agerite Resin D | 2.00 |
| Sulfur | 3.50 |
| N-Cyclohexylbenzo-thiazole sulfenamide | 1.00 |
| Total Parts | 224.50 |

TABLE 21

| Sample Description[1] | N-660 C. B. | Treated Clay B | Hi-Treated Clay B | Treated Clay A* |
|---|---|---|---|---|
| Rheometer (T = 90%), min | 15:13 | 22:50 | 22:25 | 16:20 |
| Durometer (Shore A), pts | 78 | 65 | 68 | 69 |
| Tensile, (psi) | 2870 | 3020 | 3090 | 2780 |
| Elongation, % | 300 | 630 | 580 | 440 |
| Modulus (psi) | | | | |
| @ 100% Elongation | 1000 | 500 | 650 | 870 |
| @ 200% Elongation | 2260 | 930 | 1220 | 1620 |
| @ 300% Elongation | 2870 | 1190 | 1530 | 2090 |
| Tear Die "C", pli | 296 | 343 | 392 | 357 |

[1]Clay samples also contain 4.0 phr of N-660 C.B.

Automotive Radiator Hose Compound

In this example, a radiator hose formulation was chosen to compare the performance of N-550 and N-990 see table 23 carbon blacks to Treated Clay B, Hi-Treated Clay B or Treated Clay A* (see Table 22). This compound is an unusual formulation in that the clay loading is over three times that of the rubber polymer (352 phr). This situation results from formulation adjustments to maintain constant hardness when replacing carbon black with treated clay. The high clay loading is used to demonstrate the crosslink density benefits of Treated Clay A* while not necessarily using an optimum formulation. All fillers provided comparable tensile and tear. However, the 300% modulus provided by the treated clay of this invention, Treated Clay A*, surpasses that of carbon black, as well as that for all of the prior art, silane-treated clays.

TABLE 22

Automotive Radiator Hose Compound

| Ingredients | phr |
|---|---|
| EPDM 1145 | 100.00 |
| Carbon Black or Treated Clay | See Table 23 |
| Aromatic Oil | 120.00 |
| Stearic Acid | 1.00 |
| Zinc Oxide | 5.00 |
| Sulfur | 1.50 |
| Zinc dimethyldithiocarbamate | 1.25 |
| 2-Tetramethylthiuram disulfide | 1.25 |
| 2-mercaptobenzothiazole | .50 |
| Tellurium diethyldithiocarbamate | 0.80 |

TABLE 23

| Sample Description[1] | N-550/ N-990 | Treated Clay B | Hi-Treated Clay B | Treated Clay A* |
|---|---|---|---|---|
| Filler Loading, phr | 120.0/ 100.0 | 352.0 | 352.0 | 352.0 |
| Rheometer (T = 90%), min | 11:25 | 18:47 | 16:53 | 18:35 |
| Durometer (Shore A), pts | 70 | 71 | 72 | 72 |
| Tensile, (psi) | 1150 | 950 | 1070 | 1050 |
| Elongation, % | 540 | 540 | 480 | 420 |
| Modulus (psi) | | | | |
| @ 100% Elongation | 400 | 420 | 510 | 490 |
| @ 200% Elongation | 770 | 690 | 830 | 870 |
| @ 300% Elongation | 940 | 810 | 940 | 1020 |
| Tear Die "C", pli | 162 | 148 | 160 | 147 |

[1]Clay samples contain 5.0 phr N-550.

V-Belt (Tensile Gum) Compound

In this example, a V-belt compound was examined. As is shown in Table 24, this rubber formulation uses polychloroprene, N-550 carbon black, and precipitated silica. The curing agent is zinc oxide which is unique among the formulations thus shown. Both the carbon black and silica are replaced by Treated Clay B, Hi-Treated Clay B, and then Treated Clay A*.

Table 25 reports the physical testing results. The modulus and abrasion properties of this formulation are improved over the prior art, silane-treated clays by using the multi-component treatment of Treated Clay A*, though they are not as high as those provided by the carbon black. Tear properties are particularly critical in V-belt applications and the tear value of the Treated Clay A* sample is the highest of all samples including the carbon black sample.

TABLE 24

V - Belt (Tensile Gum) Compound

| Ingredients | phr |
|---|---|
| Polycholorprene GK | 100.00 |
| Carbon Black or Treated Clay | see Table 25 |
| Hydrotreated Naphthenic oil | 12.00 |
| Dioctylphthalate | 6.00 |
| Stearic Acid | 2.50 |
| Magnesium Oxide | 4.00 |

TABLE 24-continued

V - Belt (Tensile Gum) Compound

| Ingredients | phr |
|---|---|
| Agerite HP-S | 2.00 |
| Agerite Stalite | 2.00 |
| Zinc Oxide | 6.00 |

TABLE 25

| Sample Description[1] | N-550 C.B./ Pptd silica | Treated Clay B | Hi-Treated Clay B | Treated Clay A |
|---|---|---|---|---|
| Filler Loading, phr | 50.0/20.0 | 100.0 | 100.0 | 100.0 |
| Rheometer (T = 90%), min | 19:17 | 22:25 | 22:05 | 19:45 |
| Durometer (Shore A) pts | 76 | 63 | 64 | 66 |
| Tensile, (psi) | 2460 | 2480 | 2350 | 1960 |
| Elongation, % | 330 | 800 | 730 | 550 |
| Modulus (psi) | | | | |
| @ 100% Elongation | 770 | 490 | 620 | 820 |
| @ 200% Elongation | 1540 | 770 | 1080 | 1410 |
| @ 300% Elongation | 2250 | 900 | 1270 | 1630 |
| Tear Die "C", pli | 367 | 233 | 338 | 420 |
| NBS Abrasion, cycles | 428 | 186 | 237 | 253 |

Clay samples contain 4.00 phr N-550 C.B.

Innertube Rubber Compound

The innertube formulation examined in this example uses EPDM, butyl rubber, and N-660 carbon black (Table 26). The carbon black was completely replaced by Treated Clay B, Hi-carbon black was completely replaced by Treated Clay B, Hi-Treated Clay B and Treated Clay A*. The performance data in Table 27 show that two of the treated clay samples have higher moduli as compared to carbon black, including Treated Clay A*. The tear values of Treated Clay A* and carbon black are essentially equivalent whereas the tensile values show an interesting reversal in trend as compared to the increasing trend for modulus.

TABLE 26

Innertube Compound

| Ingredients | phr |
|---|---|
| EPDM 2200 | 20.00 |
| Butyl 268 | 80.00 |
| Carbon Black or Treated Clay | See Table 27 |
| ASTM 104B oil | 25.00 |
| Zinc Oxide | 5.00 |
| Stearic Acid | 1.00 |
| Sulfur | 1.00 |
| Tetramethylthiuram disulfide | 1.50 |
| 2-Mercapto-benzothiazole | 0.50 |

TABLE 27

| Sample Description[1] | N-660 C. B. | Treated Clay B | Hi-Treated Clay B | Treated Clay A* |
|---|---|---|---|---|
| Filler Loading, phr | 70.0 | 112.0 | 112.0 | 112.0 |
| Rheometer (T = 90%), mins. | 14:15 | 17:47 | 15:50 | 16:08 |
| Durometer (Shore A), pts | 51 | 49 | 51 | 54 |
| Tensile, (psi) | 1700 | 1800 | 1620 | 1370 |

TABLE 27-continued

| Sample Description[1] | N-660 C. B. | Treated Clay B | Hi-Treated Clay B | Treated Clay A* |
|---|---|---|---|---|
| Elongation, % | 630 | 770 | 650 | 580 |
| Modulus (psi) | | | | |
| @ 100% Elongation | 230 | 250 | 310 | 330 |
| @ 200% Elongation | 490 | 450 | 610 | 660 |
| @ 300% Elongation | 740 | 600 | 810 | 870 |
| Tear Die "C", pli | 191 | 158 | 178 | 188 |

[1]Clay samples contain 4.00 phr N-660 C.B.

As such, an invention has been disclosed in terms of preferred embodiments thereof which fulfill each of the objects of the present invention as set forth above and provides a new and improved treated clay product, method of making an improved clay feed stock, an improved rubber formulation and a method of making the rubber formulation.

Various changes, modifications and alterations from the teachings of the present invention may be contemplated by those skilled in the art without departing from the intended spirit and scope thereof. Accordingly, it is intended that the present invention only be limited by the terms of the appended claims.

What is claimed is:

1. A method of preparing a hydrous, waterwashed kaolin clay feedstock to be used as a clay substrate which is surface treated with a methylene acceptor, a methylene donor and a functional silane to form a treated clay product comprising the steps of:
   a) obtaining a crude kaolin clay;
   b) blunging the crude clay into a clay slurry to form a clay feedstock by adding an amount of a dispersant to maintain a specific overall surface charge value more positive than about −22 millivolts as measured at a pH of 7 by zeta potential determination on the clay feedstock after degritting and fractionation.

2. The method of claim 1 wherein the dispersant is an inorganic dispersant selected from the group consisting of sodium silicate, tetrasodium pyrophosphate, sodium tripolyphosphate, and sodium hexametaphosphate.

3. The method of claim 2 wherein an inorganic dispersant amount on an active basis ranges between zero and 1.0% by weight based on dry clay.

4. The method of claim 3 wherein the active dispersant amount ranges between zero and 0.75%.

5. The method of claim 4 wherein the active dispersant amount. is between zero and 0.35%.

6. The method of claim 1 wherein after step (b), the clay feedstock is beneficiated and surface treated by the sequential steps of:
   a) degritting the clay feedstock to form a partially-degritted clay slurry;
   b) centrifugally fractionating the clay slurry into a fine particle size overflow clay;
   c) screening the fine particle size overflow clay slurry to remove residual +325 mesh grit; and
   d) either surface treating said clay feedstock slurry or drying the clay feedstock slurry to form a dry kaolin clay product and then surface treating the dry kaolin clay product.

7. The method of claim 6 wherein the partially-degritted clay slurry is centrifugally fractionated into a fine particle size overflow clay having at least 90% by weight of its particles less than 2 microns in particle size as determined by a x-ray Sedigraph.

8. The method of claim 7 wherein the fine particle size overflow clay has a BET surface area of less than 30 m$^2$/g.

9. The method of claim 6 wherein spray drying is used to form the dry kaolin clay feedstock.

10. The method of claim 1 wherein the specific overall surface charge value is maintained to be more positive than −16 millivolts on the clay feedstock as measured at a pH of 7 by zeta potential determination.

11. A hydrous kaolin clay feedstock made by the method of claim 1.

12. A hydrous, waterwashed kaolin clay feedstock made by the method of claim 8.

13. The hydrous kaolin clay feedstock of claim 11 having a zeta potential value measured at a pH of 7 in millivolts more positive than −16.

14. The hydrous, waterwashed kaolin clay feedstock of claim 12 having a zeta potential value measured at a pH of 7 in millivolts more positive than −16.

* * * * *

UNITED STATES PATENT AND TRADEMARK OFFICE
CERTIFICATE OF CORRECTION

PATENT NO.   : 5,840,113
DATED        : November 24, 1998
INVENTOR(S)  : Freeman et al.

It is certified that error appears in the above-identified patent and that said Letters Patent is hereby corrected as shown below:

<u>Title page,</u>
Item [75], Inventors, should read as follows:
-- Gary M. Freeman; Carl J. Marshall, Jr.; Walter O. Lackey, all of Macon, GA --

Signed and Sealed this

Fourteenth Day of October, 2003

JAMES E. ROGAN
*Director of the United States Patent and Trademark Office*